(12) United States Patent
Iwano et al.

(10) Patent No.: US 8,746,777 B2
(45) Date of Patent: Jun. 10, 2014

(54) TOP-HINGED DOOR STRUCTURE

(75) Inventors: Yoshihiro Iwano, Toyota (JP); Kosuke Ebina, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 13/203,592

(22) PCT Filed: Nov. 16, 2009

(86) PCT No.: PCT/JP2009/069453
§ 371 (c)(1),
(2), (4) Date: Aug. 26, 2011

(87) PCT Pub. No.: WO2011/058658
PCT Pub. Date: May 19, 2011

(65) Prior Publication Data
US 2012/0272580 A1  Nov. 1, 2012

(51) Int. Cl.
*B60J 5/10* (2006.01)
(52) U.S. Cl.
USPC ................................. 296/146.11; 296/146.8
(58) Field of Classification Search
USPC .............. 296/207, 146.8, 146.11, 56; 49/502
See application file for complete search history.

(56) References Cited

U.S. PATENT DOCUMENTS

| | | | | |
|---|---|---|---|---|
| 4,341,414 A | * | 7/1982 | Chiba | 296/56 |
| 4,761,852 A | * | 8/1988 | Sauber | 16/237 |
| 4,790,047 A | * | 12/1988 | Myslicki | 16/386 |
| 6,659,538 B2 | * | 12/2003 | Scheid | 296/146.8 |
| 7,021,698 B2 | * | 4/2006 | Yamada et al. | 296/146.8 |
| 7,089,626 B2 | * | 8/2006 | Alexander | 16/249 |
| 7,537,267 B2 | * | 5/2009 | Tanaka et al. | 296/146.6 |
| 7,618,083 B2 | * | 11/2009 | Munenaga et al. | 296/146.6 |
| 8,182,025 B2 | * | 5/2012 | Auchter-Bruening | 296/191 |
| 8,256,825 B1 | * | 9/2012 | Dryja | 296/146.8 |
| 2005/0046229 A1 | | 3/2005 | Kazuhiko et al. | |

(Continued)

FOREIGN PATENT DOCUMENTS

| | | |
|---|---|---|
| JP | U-62-103975 | 7/1987 |
| JP | A-04-138916 | 5/1992 |

(Continued)

OTHER PUBLICATIONS

International Search Report issued in Application No. PCT/JP2009/069453; Dated Feb. 16, 2010 (With Translation).

(Continued)

*Primary Examiner* — Jason S Morrow
*Assistant Examiner* — E Turner Hicks
(74) *Attorney, Agent, or Firm* — Oliff PLC

(57) ABSTRACT

At a back door structure, a back door, that is rotatably supported at a rear roof header via a pair of door hinges, rotates around hinge shafts and opens and closes a rear opening portion. The back door is held in a fully open posture that opens the rear opening portion, by a single damper that is provided only at a right side with respect to the rear opening portion. In the back door structure, a fit posture of the back door is corrected due to a vertical position of a mounting surface of the door hinge at the right side being set at an upper side with respect to a mounting surface of the door hinge at a left side in a state of not supporting the back door.

17 Claims, 17 Drawing Sheets

(56) References Cited

U.S. PATENT DOCUMENTS

| | | | |
|---|---|---|---|
| 2007/0096502 A1* | 5/2007 | Hakamata et al. | 296/146.8 |
| 2008/0127570 A1* | 6/2008 | Andre et al. | 49/502 |
| 2012/0248814 A1* | 10/2012 | Tsukiyama et al. | 296/146.8 |

FOREIGN PATENT DOCUMENTS

| JP | A-05-195666 | 8/1993 |
|---|---|---|
| JP | A-07-246837 | 9/1995 |
| JP | A-08-324255 | 12/1996 |
| JP | A-09-170374 | 6/1997 |
| JP | A-09-220934 | 8/1997 |
| JP | A-10-203170 | 8/1998 |
| JP | A-11-350827 | 12/1999 |
| JP | A-2000-215780 | 8/2000 |
| JP | A-2002-029261 | 1/2002 |
| JP | A-2003-291645 | 10/2003 |
| JP | 2006123840 A * | 5/2006 |
| JP | A-2006-123840 | 5/2006 |
| JP | A-2006-225898 | 8/2006 |
| JP | A-2007-245747 | 9/2007 |
| JP | A-2010-000880 | 1/2010 |
| JP | 2010260519 A * | 11/2010 |
| JP | A-2011-057188 | 3/2011 |

OTHER PUBLICATIONS

Jul. 29, 2013 Search Report issued in European Patent Application No. 13173372.7.

* cited by examiner

TOP-HINGED DOOR STRUCTURE

TECHNICAL FIELD

The present invention relates to a top-hinged door structure that supports a door, that opens and closes an opening portion of a vehicle body, by hinges that are provided at the upper side of the opening portion.

BACKGROUND TECHNOLOGY

Various contrivances such as, for example, carrying out opening/closing operation smoothly and the like, for back doors are known (see, for example, Japanese Patent Application Laid-Open (JP-A) No. 2007-245747, JP-A No. 9-220934, JP-A No. 2003-291645, JP-A No. 11-350827, and JP-A No. 8-324255).

DISCLOSURE OF THE INVENTION

Problems to be Solved by the Invention

However, with regard to a back door that is supported at a vehicle body via hinges that are disposed at the upper side of a vehicle body opening portion, when a member such as a damper or the like for maintaining the door in a fully open posture is provided at only one end side in the horizontal direction at the vehicle body, there is room for improvement in fitting the door.

An object of the present invention is to obtain, in a structure in which a door holding mechanism for maintaining a door in a fully open posture is provided at only one end side in the horizontal direction, a top-hinged door structure that can properly assemble the door to the vehicle body.

Means for Solving the Problems

A top-hinged door structure relating to a first aspect of the present invention has: a pair of hinges that are provided at the vehicle body, so as to be apart in a horizontal direction, at an upper side in a vehicle vertical direction with respect to an opening portion formed in the vehicle body; a door that is supported at the vehicle body by the pair of hinges, and that opens and closes the opening portion by rotating with hinge shafts of the hinges being fulcra; a door holding mechanism that is provided between the door and the vehicle body at one end side of the door in the horizontal direction, that produces resistance force against self-weight of the door and maintains a posture in which the door fully opens the opening portion, and that, due to load exceeding the resistance force, permits the door being moved in a direction of closing the opening portion; and a door supporting structure that is structured such that, in a state of not supporting the door, one hinge shaft of one hinge that is positioned at a side at which the door holding mechanism is set among the pair of hinges, is positioned further toward an upper side in the vehicle vertical direction than the other hinge shaft of the other hinge.

In accordance with the above-described aspect, with regard to the door that rotates with the hinge shafts as fulcra and opens and closes the opening portion of the vehicle body, the posture of fully opening the opening portion is maintained by the door holding mechanism against the self-weight. When load in the closing direction (toward the bottom of the vehicle) of a predetermined value or more that exceeds this resistance force is applied to the door, the door reaches a posture of closing the opening portion against the resistance force of the door holding mechanism.

By the way, in a structure in which the door holding mechanism is provided at only one end side in the horizontal direction between the vehicle body and the door, due to the reaction force of the door holding mechanism, it is easy for the door to be rotated with respect to the vehicle body such that a portion at the side at which the door holding mechanism at the door is set is positioned at the lower side, in the vehicle vertical direction, with respect to the opposite side.

Here, in the door supporting structure that structures the top-hinged door structure of the above-described aspect, in a state of not supporting the door, the hinge that is positioned at the side at which the door holding mechanism is set among the pair of hinges, is positioned further toward the upper side in the vehicle vertical direction than the other hinge. Therefore, even if the door is rotated as described above, positional offset in the vehicle vertical direction can be kept small at the portion at the side at which the door holding mechanism at the door is set, and at the opposite side.

In this way, in the structure relating to the above-described aspect, a door can be assembled properly to a vehicle body in a structure in which a door holding mechanism for maintaining the door in a fully open posture is provided at only one end side in the horizontal direction.

In the above-described aspect, the door supporting structure may be a structure that is structured such that, in the state of not supporting the door, a mounting surface to which the hinge at the vehicle body is mounted is positioned further toward the upper side in the vehicle vertical direction at one hinge side that is positioned at the side at which the door holding structure is set, than at the other hinge side.

In accordance with the above-described aspect, while using the pair of hinges in common, positional offset in the vehicle vertical direction can be kept small at the portion at the side at which the door holding mechanism at the door is set, and at the opposite side. Further, due to the above-described rotation of the door with respect to the vehicle body, the vehicle body around the hinge mounting surfaces is elastically deformed toward the lower side, more greatly at the side at which the door holding mechanism is set than at the opposite side. Therefore, the supporting reaction force at the side at which the door holding mechanism is set is larger than at the opposite side. Due thereto, the above-described rotation itself of the door with respect to the vehicle body is suppressed.

A top-hinged door structure relating to a second aspect of the present invention has: a pair of hinges that are provided at the vehicle body, so as to be apart in a horizontal direction, at an upper side in a vehicle vertical direction with respect to an opening portion formed in the vehicle body; a door that is supported at the vehicle body by the pair of hinges, and that opens and closes the opening portion by rotating with hinge shafts of the hinges being fulcra; a door holding mechanism that is provided between the door and the vehicle body at one end side of the door in the horizontal direction, and that produces resistance force against self-weight of the door and maintains a posture in which the door fully opens the opening portion, and that, due to load exceeding the resistance force, permits the door being moved in a direction of closing the opening portion; and a door supporting structure that is structured such that supporting reaction force, in the vehicle vertical direction, of a mounting portion of one hinge that is positioned at a side at which the door holding mechanism is set among the pair of hinges, is greater than supporting reaction force, in the vehicle vertical direction, of a mounting portion of the other hinge.

In accordance with the above-described aspect, with regard to the door that rotates with the hinge shafts as fulcra and opens and closes the opening portion of the vehicle body, the posture of fully opening the opening portion is maintained by the door holding mechanism against the self-weight. When load in the closing direction (toward the bottom of the vehicle) of a predetermined value or more that exceeds this resistance force is applied to the door, the door reaches a posture of closing the opening portion against the resistance force of the door holding mechanism.

By the way, in a structure in which the door holding mechanism is provided at only one end side in the horizontal direction between the vehicle body and the door, due to the reaction force of the door holding mechanism, it is easy for the door to be rotated with respect to the vehicle body such that a portion at the side at which the door holding mechanism at the door is set is positioned at the lower side, in the vehicle vertical direction, with respect to the opposite side.

Here, in the door supporting structure that structures the top-hinged door structure of the above-described aspect, at the mounting portion of the hinge that is positioned at the side at which the door holding mechanism is set among the pair of hinges, the supporting reaction force in the vehicle vertical direction is made to be greater than at the mounting portion of the other hinge. Therefore, at the side at which the door holding mechanism is set, it is difficult for the door to be displaced toward the lower side in the vehicle vertical direction, due to the reaction force of the door holding mechanism. Namely, the above-described rotation of the door with respect to the vehicle body, that is caused by the door holding mechanism being provided at only one end side, is suppressed.

In this way, in the structure relating to the above-described aspect, a door can be assembled properly to a vehicle body in a structure in which a door holding mechanism for maintaining the door in a fully open posture is provided at only one end side in the horizontal direction.

In the above-described aspect, the door holding structure may be a structure that is structured such that, in the state of not supporting the door, a mounting surface to which the hinge at the vehicle body is mounted is positioned further toward the upper side in the vehicle vertical direction at one hinge side that is positioned at the side at which the door holding structure is set, than at the other hinge side.

In accordance with the above-described aspect, the hinge mounting surface at the vehicle body is positioned further toward upper side in the vehicle vertical direction at the side at which the door holding mechanism is set than at the opposite side. In other words, the displacement amount (stroke) of the door upper end portion due to the above-described rotation of the door with respect to the vehicle body is made to be greater at the side at which the door holding mechanism is set than at the opposite side. Due thereto, the vehicle body is elastically deformed toward the lower side more greatly at the side at which the door holding mechanism is set than at the opposite side, and therefore, the supporting reaction force of the door is made to be greater at the side at which the door holding mechanism is set than at the opposite side. Moreover, because the side at which the door holding mechanism is set is positioned at the upper side, positional offset in the vehicle vertical direction can be kept small at the portion at the side at which the door holding mechanism at the door is set, and at the opposite side.

In the above-described aspect, there may be a structure in which the respective mounting surfaces are surfaces that face toward an upper side in the vehicle vertical direction, and the pair of hinges are fixed to the vehicle body by bolts that pass-through, in the vehicle vertical direction, a vehicle body panel that has the mounting surfaces.

In accordance with the above-described aspect, the hinges are fixed on the mounting surfaces of the vehicle body by fastening force in the vehicle vertical direction due to bolts. In this structure, it is easy for the vehicle body (a sheet metal) to elastically deform in the vehicle vertical direction (the plate thickness direction), and therefore, by positioning the mounting surface to be further toward the upper side in the vehicle vertical direction at the side at which the door holding mechanism is set than at the opposite side, assembling the door to the vehicle body properly is easy.

In the above-described aspect, the top-hinged door structure may be a structure that further has a regulating member that is provided between the vehicle body and a portion, at an opposite side in the horizontal direction of the side at which the door holding structure is set, at a lower portion of the door in the vehicle vertical direction, and that regulates the door, that is in a posture of closing the opening portion, being displaced in a direction of closing the opening portion with respect to the vehicle body.

In a structure in which a door holding mechanism is provided at only one end side in the horizontal direction at the door, due to the reaction force of the door holding mechanism, the door tilts easily with respect to the vehicle body such that the portion at the side at which the door holding mechanism at the door is set is pushed-out toward the vehicle outer side with respect to the opposite side.

Here, in accordance with the above-described aspect, displacement, toward the vehicle body side, of the door that is in the posture of closing the opening portion is regulated (the door receives regulating force) by the regulating member at a portion that is at the opposite side, in the horizontal direction and the vertical direction, with respect to the portion at which reaction force from the door holding mechanism is applied. Therefore, a moment against the above-described tilting of the door arises due to the regulating force by the regulating member, and tilting of the door is suppressed.

A top-hinged door structure relating to a third aspect of the present invention has a pair of hinges that are provided at the vehicle body, so as to be apart in a horizontal direction, at an upper side in a vehicle vertical direction with respect to an opening portion formed in the vehicle body; a door that is supported at the vehicle body by the pair of hinges, and that opens and closes the opening portion by rotating with hinge shafts of the hinges being fulcra; a door holding mechanism that is provided between the door and the vehicle body at one end side of the door in the horizontal direction, and that produces resistance force against self-weight of the door and maintains a posture in which the door fully opens the opening portion, and that, due to load exceeding the resistance force, permits the door being moved in a direction of closing the opening portion; and a regulating member that is provided between the vehicle body and a portion, at an opposite side in the horizontal direction of a side at which the door holding structure is set, at a lower portion of the door in the vehicle vertical direction, and that regulates the door, that is in a posture of closing the opening portion, being displaced in a direction of closing the opening portion with respect to the vehicle body.

In accordance with the above-described aspect, with regard to the door that rotates with the hinge shafts as fulcra and opens and closes the opening portion of the vehicle body, the posture of fully opening the opening portion is maintained by the door holding mechanism against the self-weight. When load in the closing direction (toward the bottom of the vehicle) of a predetermined value or more that exceeds this resistance force is applied to the door, the door reaches a posture of closing the opening portion against the resistance force of the door holding mechanism.

By the way, in a structure in which a door holding mechanism is provided at only one end side in the horizontal direction at the door, due to the reaction force of the door holding mechanism, the door tilts easily with respect to the vehicle body such that the portion at the side at which the door holding mechanism at the door is set is pushed-out toward the vehicle outer side with respect to the opposite side.

Here, in the top-hinged door structure of the above-described aspect, the restricting member is provided at the opposite side of the side at which the door holding mechanism is set, between the vehicle body and the door. Therefore, displacement, toward the vehicle body side, of the door that is in the posture of closing the opening portion is regulated (the door receives regulating force) by the regulating member at a portion that is at the opposite side, in the horizontal direction and the vertical direction, with respect to the portion at which reaction force from the door holding mechanism is applied. Therefore, a moment against the above-described tilting of the door with respect to the vehicle body arises due to the resistance force of the regulating member, and tilting of the door is suppressed.

In this way, in the structure relating to the above-described aspect, a door can be assembled properly to a vehicle body in a structure in which a door holding mechanism for maintaining the door in a fully open posture is provided at only one end side in the horizontal direction.

In the above-described aspect, the regulating member may be a structure that, in a state in which the door closes the opening portion, is disposed so as to be elastically compressed between the door and the vehicle body.

In accordance with the above-described aspect, in a posture of closing the opening portion, the door always contacts the regulating member, and is nipped-in, in an elastically compressed state, between the regulating member and the vehicle body. Therefore, the greater the above-described tilting of the door becomes, the greater the regulating force against this tilting becomes. Further, relative displacement (e.g., rattling or the like) of the door with respect to the vehicle body is suppressed.

In the above-described aspect, there may be a structure in which the door is structured to have a window portion, and at least a portion of a peripheral edge portion of the window portion is reinforced with respect to load in the vehicle vertical direction.

In accordance with the above-described aspect, the vertical direction rigidity of the door, at which the peripheral edge portion of the window portion is reinforced, is improved. Therefore, due to the reaction force of the door holding mechanism that is provided at only one side of the opening portion in the transverse direction, the door itself deforming in the vehicle vertical direction is suppressed, and positional offset in the vehicle vertical direction is kept small at the portion at the side at which the door holding mechanism at the door is set, and at the opposite side.

In the above-described aspect, there may be a structure in which the door holding mechanism is structured by a vehicle body side member, that is connected to a portion positioned at one end side in the horizontal direction with respect to the opening portion at an upper portion of the vehicle body, and a door side member, that is connected to a same side as a connected side of the vehicle body side member with respect to the opening portion at the door, the vehicle body side member and the door side member being connected so as to be able to extend and contract due to relative displacement in a mutual longitudinal direction, and the door holding mechanism is structured so as to generate assisting force while extending when the door opens the opening portion, and so as to generate the resistance force while shortening when the door closes the opening portion.

In accordance with the above-described aspect, reaction force, that can cause the door that is closing the opening portion to have the above-described rotation/tilting of the door with respect to the vehicle body, is inputted from the door holding mechanism. However, due to the above-described door holding mechanism, assembling of the door in a proper posture with respect to the vehicle body is ensured.

Effects of the Invention

As described above, the top-hinged door structure relating to the present invention has the excellent effect of being able to properly assemble a door to a vehicle body in a structure in which a door holding mechanism for maintaining the door in a fully open posture is provided at only one end side in the horizontal direction.

BEST FORMS FOR EMBODYING THE INVENTION

Figure 1:
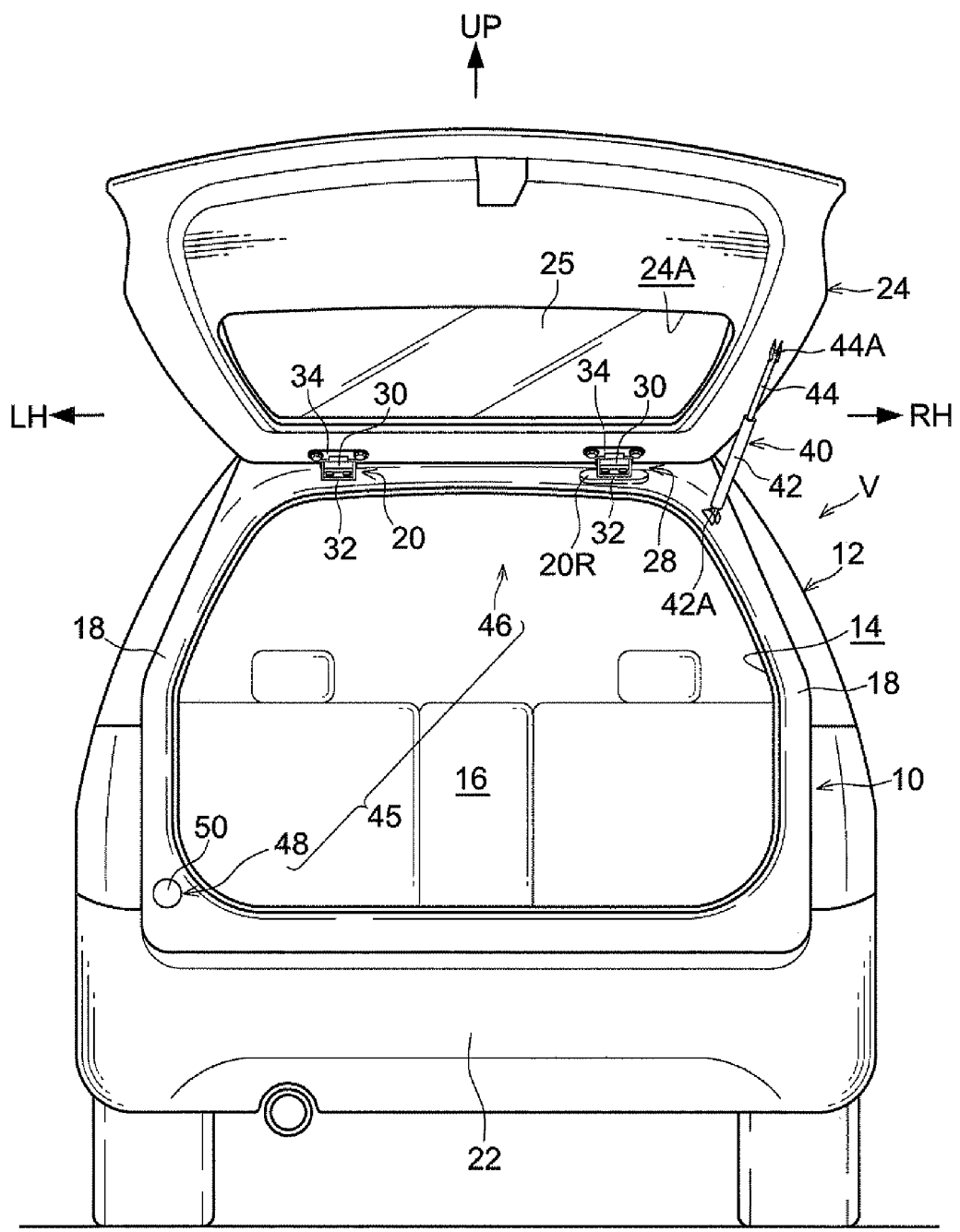
FIG. 1 is a rear view showing an open state of a rear opening portion at a vehicle to which a back door structure relating to a first embodiment of the present invention is applied.

A back door structure 10, to which a top-hinged door structure relating to a first embodiment of the present invention is applied, is described on the basis of FIG. 1 to FIG. 10. Note that arrow FR shown appropriately in the drawings indicates the forward direction in the vehicle longitudinal direction, arrow UP indicates the upward direction in the vehicle vertical direction, the arrow RH indicates the right side, when looking in the forward direction, that is one side in the vehicle transverse direction, and arrow LH indicates the left side that is the opposite direction of arrow RH, respectively. Further, in the following explanation, when using the longitudinal, vertical and left/right directions, the longitudinal direction (vehicle longitudinal direction), vertical direction, and left/right direction of a vehicle V are indicated unless specially mentioned.

The schematic structure of the vehicle V to which the back door structure 10 is applied is shown in a rear view in FIG. 1. As shown in this drawing, a rear opening portion 14 that opens rearward is formed in a vehicle body 12 of the vehicle V. The rear opening portion 14 is an opening portion for accessing a luggage compartment 16 that is a space at the rear of the passenger space (the seats) of the vehicle V. Concretely, the rear opening portion 14 is an opening portion that is substantially rectangular in rear view, and that is surrounded by a pair of left and right rear pillars (D pillars) 18, a rear roof header 20, and a rear bumper 22 (an unillustrated lower back panel).

The rear opening portion 14 is opened and closed by a back door 24 that is an example of the door in the present invention. A back window 24A serving as a window portion is formed in the upper portion of the back door 24, and the back window 24A is closed by a back window glass 25. The back door 24 is supported with respect to the vehicle body 12 so as to be rotatable around hinge shafts 30 that run along the vehicle transverse direction, via a pair of left and right door hinges 26, 28 that are provided at the rear roof header 20.

Figure 3:
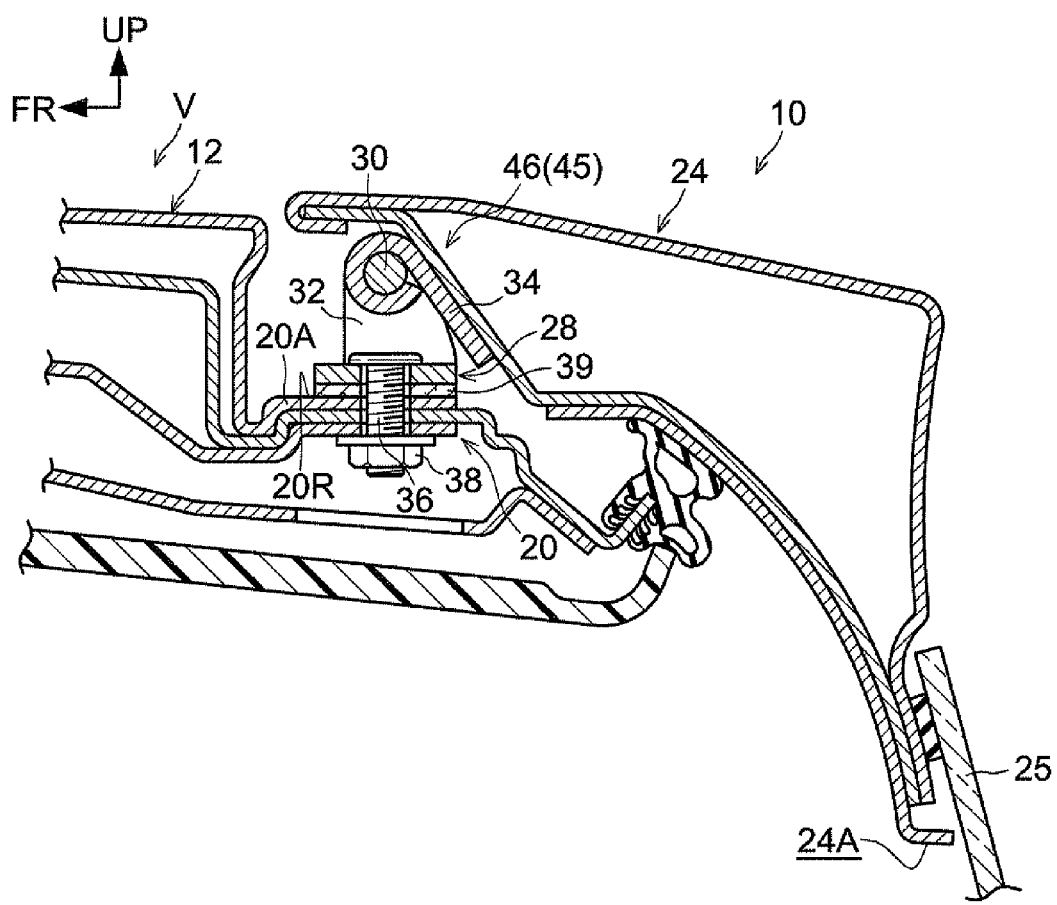
FIG. 3 is a sectional view along line 3-3 of FIG. 5, showing a rotation correcting structure that structures the back door structure relating to the first embodiment of the present invention.
Figure 4:
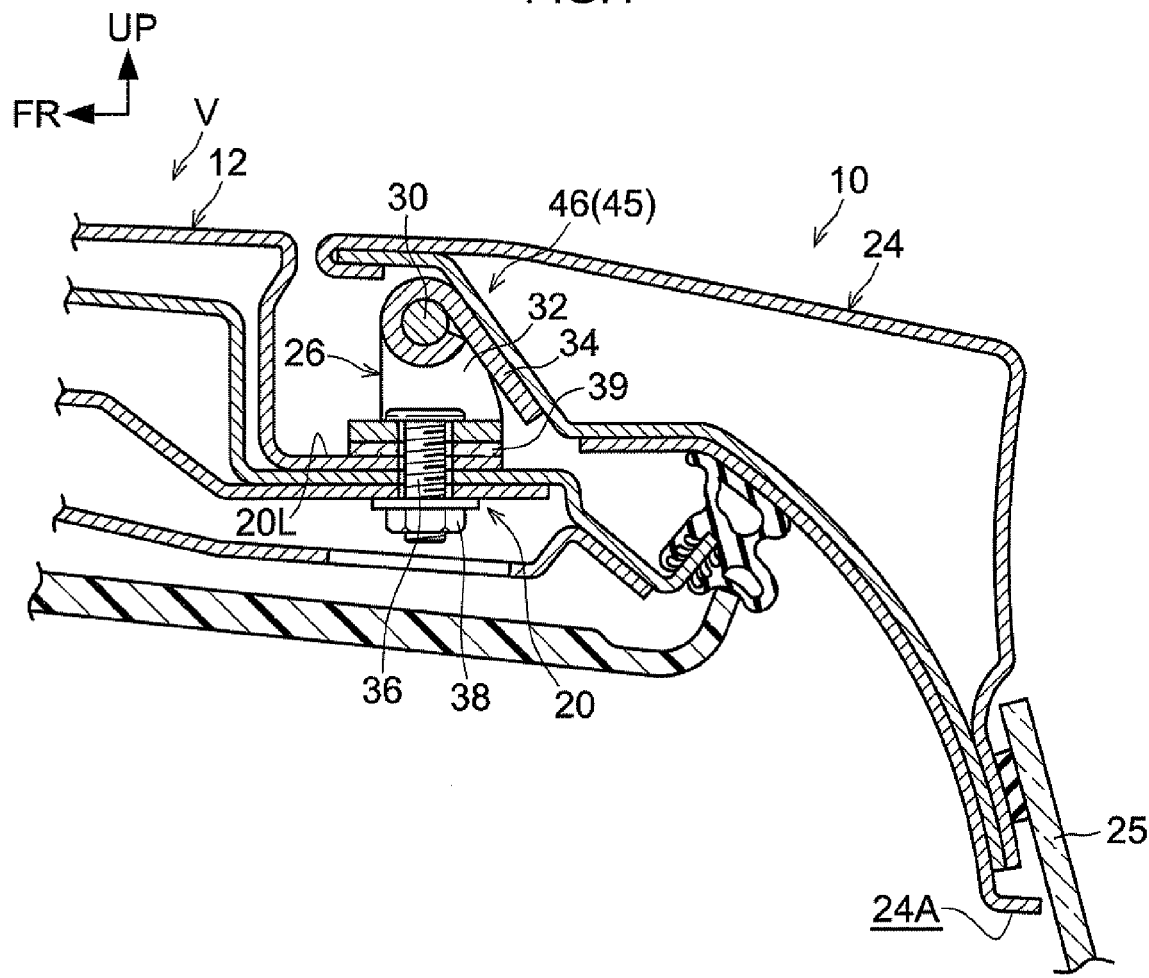
FIG. 4 is a sectional view along line 4-4 of FIG. 5, showing the rotation correcting structure that structures the back door structure relating to the first embodiment of the present invention.

Concretely, as shown in FIG. 3 and FIG. 4, the door hinges 26, 28 are structured with the main portions thereof being hinge brackets 32, at which the respective hinge shafts 30 are provided, and hinge arms 34, that are supported so as rotate freely around the hinge shafts 30 with respect to the hinge brackets 32. The hinge brackets 32 are fixed to the vehicle body 12 by being fastened to the top surface of the rear roof header 20 that is structured by a main body panel, by bolts 36, that are passed through the rear roof header 20 in the vertical direction, and nuts 38. The hinge arms 34 are joined to the upper end portion of the back door 24 by unillustrated joining means (e.g., bolts, nuts).

Figure 2:
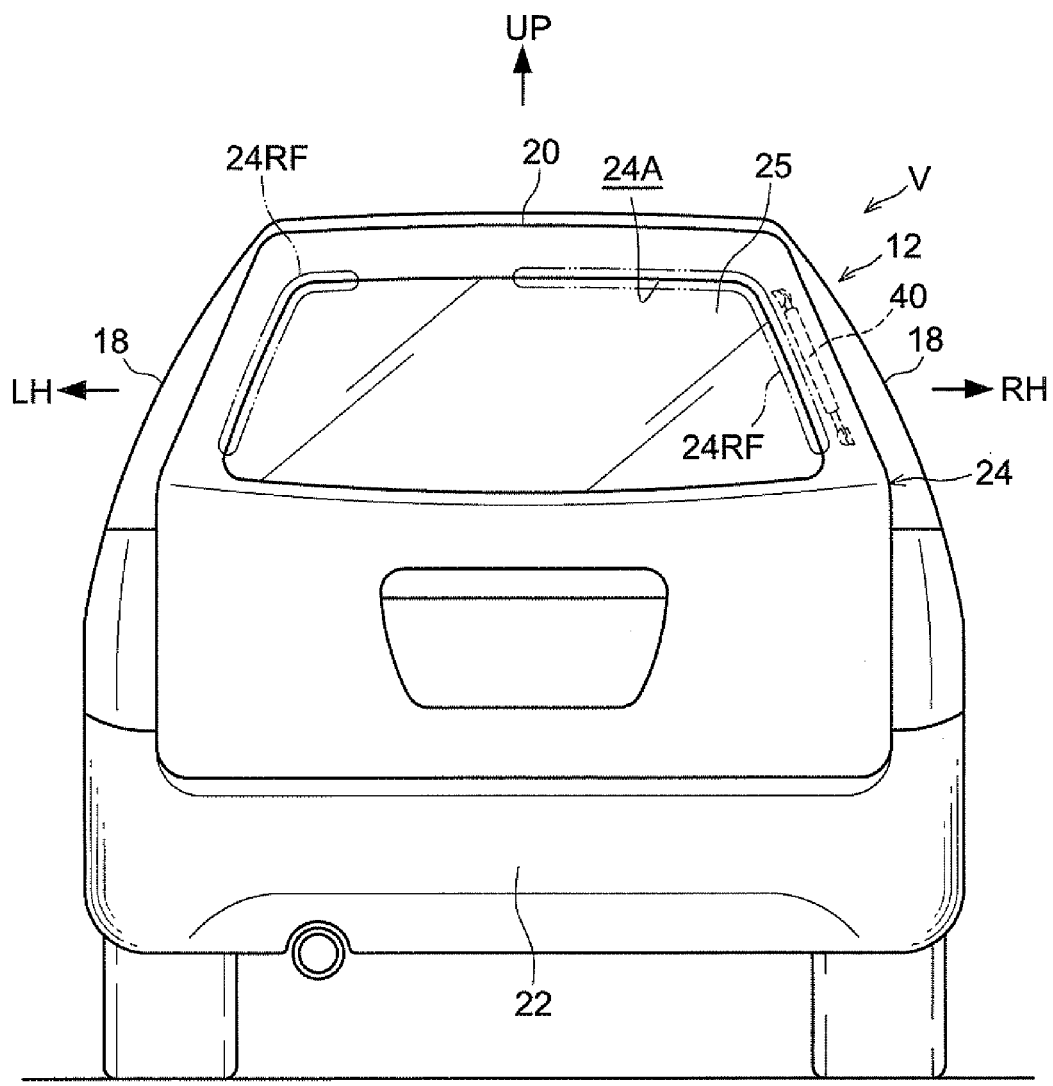
FIG. 2 is a rear view showing a closed state of the rear opening portion at the vehicle to which the back door structure relating to the first embodiment of the present invention is applied.
Figure 5:
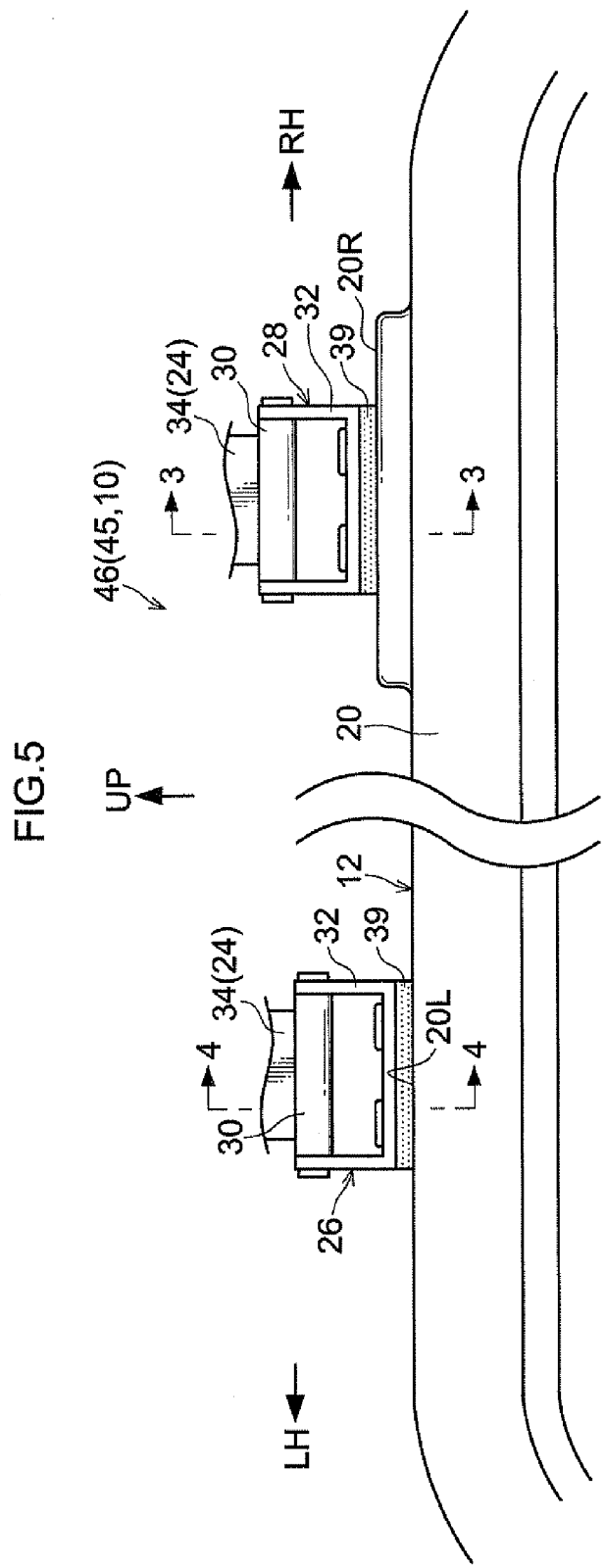
FIG. 5 is a rear view schematically showing the rotation correcting structure that structures the back door structure relating to the first embodiment of the present invention.

Due thereto, the back door 24 is structured so as to be able to, by rotation around the hinge shafts 30, assume a fully open position at which the back door 24 fully opens the rear opening portion 14 as shown in FIG. 1, and a fully closed position, at which the back door 24 fully closes the rear opening portion 14 as shown in FIG. 2. Note that, as shown in FIG. 5 as well, a shim 39 structured from a synthetic rubber or the like, is interposed between the rear roof header 20 and each hinge bracket 32.

Further, a damper 40 serving as a door holding mechanism is provided between the vehicle body 12 and the back door 24. The damper 40 has a cylinder 42 serving as a vehicle body side member, and a rod 44 serving as a door side member that is inserted in the cylinder 42 so as to be able to advance and withdraw, and the damper 40 is structured as a door holding structure that extends and contracts accompanying the advancing and withdrawing of the rod 44 with respect to the cylinder 42. The damper 40 is a structure at which resistance force is generated accompanying the shortening, by an unillustrated piston provided within the cylinder 42 and gas that is sealed within the cylinder 42. In this embodiment, the damper 40 is a structure that, when restraint toward the shortened state is cancelled, generates assisting force in the extending direction. Because the concrete structure of the damper 40 is publicly known, description thereof is omitted.

As shown in FIG. 1, at the damper 40, one end 42A of the cylinder 42 is connected to the upper portion of the vehicle body 12 so as to be able to be angularly displaced relatively, and one end 44A of the rod 44 is connected to the vertical direction intermediate portion of the back door 24 so as to be able to be angularly displaced relatively. The damper 40 is a structure that, in the extended state thereof, maintains the back door 24 in a fully open state against (the moment in the closing direction due to) the self-weight of the back door 24, by the aforementioned resistance force.

On the other hand, when downwardly-directed external force is applied to the back door 24 and a load in the shortening direction that exceeds the aforementioned resistance force is applied, the damper 40, while being shortened, permits movement of the back door 24 toward the fully closed posture side. In the fully closed posture shown in FIG. 2, the damper 40 is in the shortened state. Moreover, the damper 40 is a structure that, when the back door 24 is moved from the fully closed posture to the fully open posture side, generates the aforementioned assisting force while extending. Therefore, the damper 40 applies load even to the back door 24 in the fully closed posture, as is described below.

Further, at the back door structure 10, only the one damper 40 is provided. In this embodiment, the single damper 40 is disposed at the right side (the outer side in the vehicle transverse direction that is the horizontal direction) with respect to the rear opening portion 14. Concretely, the one end 42A of the cylinder 42 is connected to the rear pillar 18 at the right side, and the one end 44A of the rod 44 is connected to the right side portion with respect to the back window 24A at the back door 24.

Figure 7:
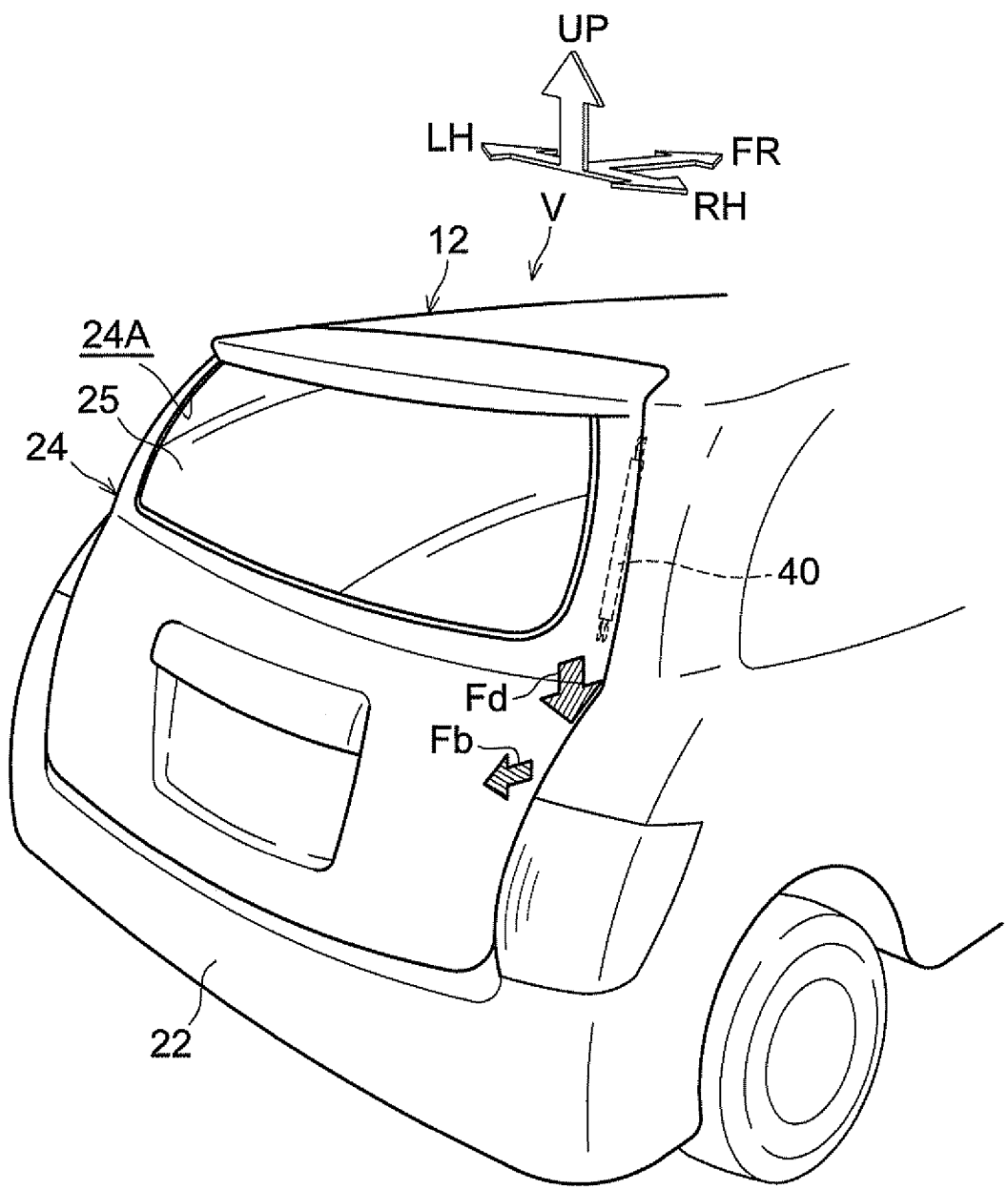
FIG. 7 is a perspective view for explaining reaction forces from a damper at the vehicle to which the back door structure relating to the first embodiment of the present invention is applied.

Therefore, at the back door structure 10, the load from the damper 40, that is applied to the back door 24 in the above-described fully closed posture, has left/right asymmetry. Concretely, at the right end portion of the back door 24, downwardly-directed load Fd is applied from the damper 40 as shown in FIG. 7. Further, as shown in this FIG. 7, in the fully closed posture of the back door 24, the damper 40 is disposed at an incline such that the lower end (the one end 44A of the rod 44) is positioned further toward the vehicle rear side than the upper end (the one end 42A of the cylinder 42). Therefore, rearwardly-directed load Fb is applied from the damper 40 at the right end portion of the back door 24.

Figure 8:
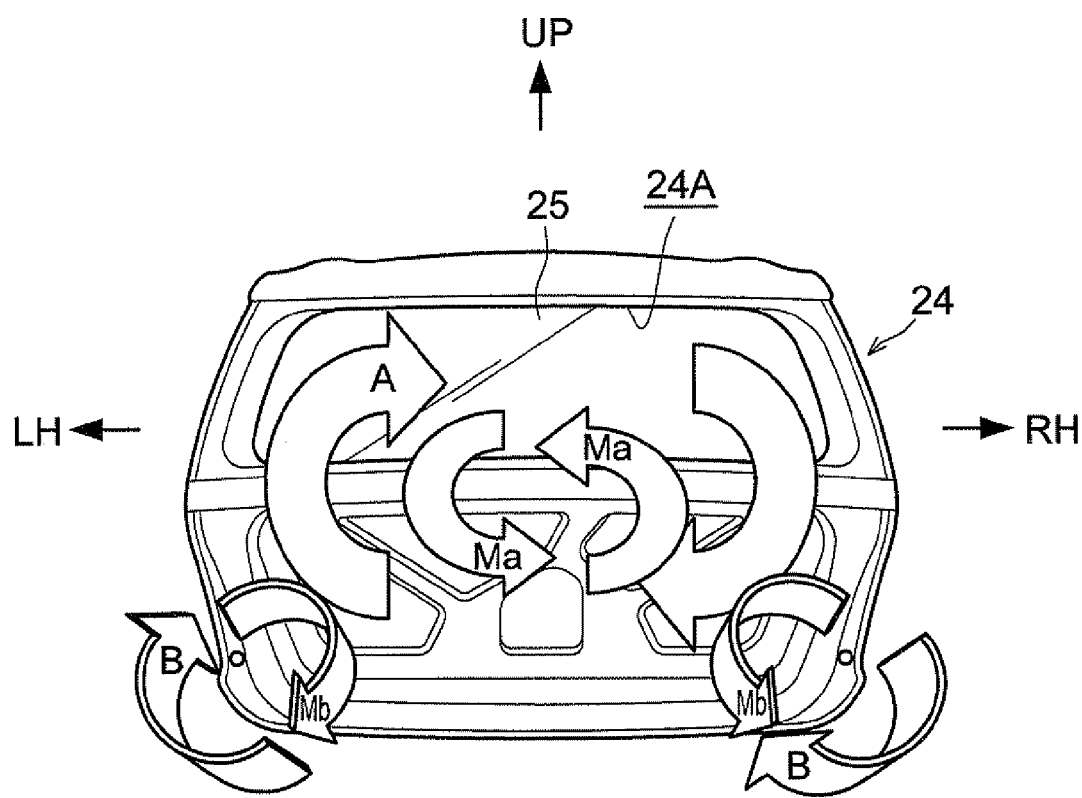
FIG. 8 is a rear view for explaining rotational displacement, inclined displacement with respect to a vehicle body of a door due to reaction force from the damper, and resistance force that suppresses these, at the vehicle to which the back door structure relating to the first embodiment of the present invention is applied.

As shown in FIG. 8, due to the load Fd, the back door 24 is a structure that generates rotational displacement (refer to arrow A) such that the right side portion of the back door 24 is displaced relatively downward and the left side portion is displaced relatively upward. Further, due to the load Fb, the back door 24 is a structure that generates inclined displacement (refer to arrows B) such that the right side portion of the back door 24 is displaced relatively rearward and the left side portion is displaced relatively forward.

Here, the back door structure 10 has a door supporting structure 45. The door supporting structure 45 can be understood to be a structure that corrects the posture of the back door 24 with respect to the vehicle body 12 on the basis of a case in which the back door 24 generates the aforementioned rotational displacement and inclined displacement with respect to the vehicle body 12 when this door supporting structure 45 is not provided. Concrete description is given hereinafter.

As shown in FIG. 5, the door supporting structure 45 includes a rotation correcting structure 46 that differs the vertical direction heights of mounting surfaces 20L, 20R of the left and right door hinge 26, 28 at the rear roof header 20 in a state of not supporting the back door 24. At the rotation correcting structure 46, the mounting surface 20R at the right side at which the damper 40 is disposed is offset toward the upper side with respect to the mounting surface 20L at the left side at which the damper 40 is not provided. Namely, at the back door structure 10, in a state of not supporting the back door 24, the hinge shaft 30 at the right side is offset further toward the upper side than the hinge shaft 30 at the left side.

As can be understood by comparing FIG. 3 and FIG. 4, the mounting surface 20L is the top surface of a protruding portion 20A that protrudes at a sheet metal that structures the rear roof header 20, and is offset toward the upper side with respect to the mounting surface 20R that is the general surface of the sheet metal that structures the rear roof header 20. The function of this rotation correcting structure 46 is described below together with the operation of the first embodiment.

Further, the door supporting structure 45 includes a tilt correcting structure 48. The tilt correcting structure 48 is structured by interposing a stopper 50 for fitting adjustment, at the lower left portion between the back door 24 that is in the fully closed posture and the vehicle body 12. Namely, the tilt correcting structure 48 is structured by disposing the stopper 50, that serves as a regulating member, at the opposite side in the vertical direction and the left/right (horizontal direction) with respect to the side at which the damper 40 is set (at a position that forms a substantial diagonal with respect to the position at which the damper 40 is set).

Figure 6:
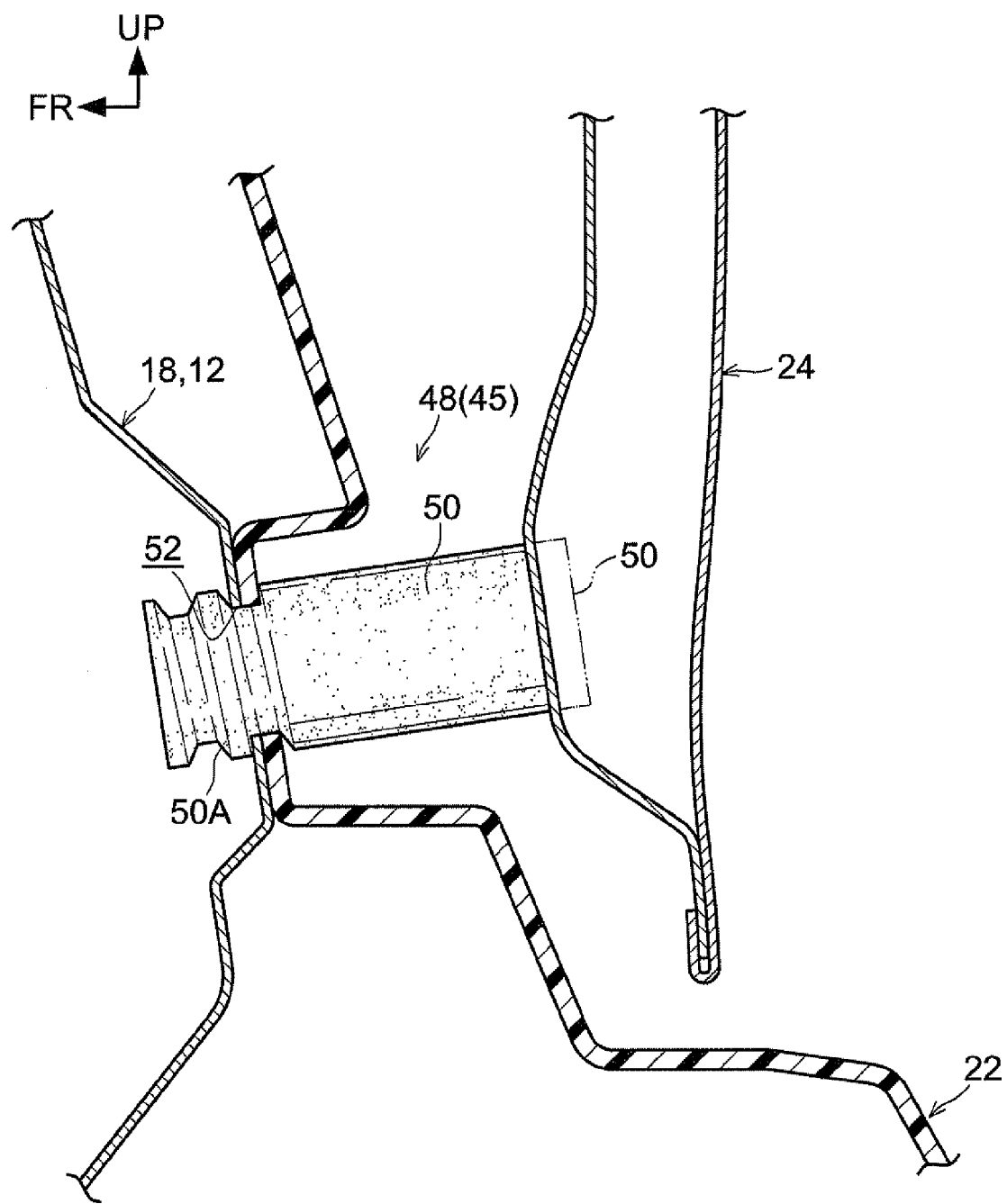
FIG. 6 is a side sectional view schematically showing a tilt correcting structure that structures the back door structure relating to the first embodiment of the present invention.

The stopper 50 in this embodiment is provided so as to project rearward as shown in FIG. 6, at a position that overlaps the lower left portion of the back door 24 in the fully closed posture in rear view at the lower portion of the rear pillar 18 at the left side (a vicinity of the boundary with the lower back panel) as shown in FIG. 1. More concretely, the stopper 50 is formed in a cylindrical shape of, for example, a rubber material or the like, and the front end side thereof is held at the aforementioned rear pillar 18 at the left side, and the rear end side is a free end.

The stopper 50 is a structure that, by being interposed, in a state of being elastically compressed in the longitudinal direction, between the back door 24 in the fully closed posture and the rear pillar 18, regulates forward displacement of the back door 24 relative to the vehicle body 12 at this interposed portion. What is shown by the imaginary line in FIG. 6 is the stopper 50 in the free state. Namely, the tilt correcting structure 48 is structured by the stopper 50 being provided by lapping design in which the space occupied by the stopper 50 in the free state and the space occupied by the back door 24 in the fully closed posture are lapped.

Accordingly, the stopper 50 that structures the tilt correcting structure 48 (the door supporting structure 45) is structured as a member that is separate from an unillustrated stopper for preventing strong closing that is for regulating the back door 24 exceeding the fully closed position and approaching the vehicle body 12. Further, the stopper 50 is structured of a material that is soft as compared with the stopper for preventing strong closing.

Further, in this embodiment, the projected amount of the stopper 50 with respect to the vehicle body 12 (the lapped amount with the back door 24) can be adjusted. Concretely, a male screw portion 50A is formed at the front end side of the stopper 50, and this male screw portion 50A is screwed-together with a screw hole 52 formed in the rear pillar 18. Accordingly, there is a structure in which, by rotating the stopper 50 around its own axis, the projected amount of the stopper 50 with respect to the vehicle body 12 can be adjusted.

Moreover, in the door supporting structure 45 in this embodiment, (the opening flange formed along) the peripheral edge portion of the back window 24A at the back door 24 is reinforced. Reinforced ranges 24RF in this embodiment are shown by the imaginary lines in FIG. 2. A structure that increases the adhesive strength between the back door 24 and the back window glass 25 that shields the back window 24A is employed as this reinforcing structure. In this embodiment, the peripheral edge portion of the back window 24A at the back door 24 is reinforced by employing a urethane adhesive (elastic coefficient after hardening 0.8 MPa) having higher strength than a usual urethane adhesive (elastic coefficient after hardening 0.1 MPa). Note that the high-strength urethane adhesive may be used over the entire periphery of the back window 24A, or may be used at only the edge portions that run along the vertical direction of the back window 24A at the back door 24.

Operation of the present embodiment is described next.

In the back door structure 10 of the above-described structure, when the rear opening portion 14 is opened, the latched state of the back door 24 by an unillustrated striker and latch mechanism is cancelled. Thus, the back door 24, whose restraining by the striker and the latch mechanism has been cancelled, is moved to the fully open position by the assisting force that accompanies the extending of the damper 40 and the light operational force of the user. The (moment in the horizontal direction that is based on the) self-weight of the back door 24 in the fully open posture is supported by the resistance force of the damper 40, and the back door 24 is held in this fully open posture.

On the other hand, when closing the rear opening portion 14, the lower portion of the back door 24 (the rear portion of the fully open posture) is pushed downward against the resistance force of the damper 40. Then, the back door 24 is rotated downward around the hinge shafts 30 while the damper 40 is shortened, and, when the back door 24 reaches the fully closed position, the back door 24 is latched by the striker and the latch mechanism. In this state, the stopper 50 is compressed between the back door 24 and the rear pillar 18.

By the way, in the back door structure 10 in which the single damper 40 connects the vehicle body 12 and the back door 24 at a vehicle transverse direction one end side as described above, rotational displacement in the arrow A direction due to the load Fd, and inclined displacement in the arrow B direction due to the load Fb, arise as described above. Therefore, in a comparative example that does not have the door supporting structure 45 (the door supporting structure 45 and the tilt correcting structure 48), the back door 24 is rotated in the arrow A direction and is assembled to the vehicle body at a posture that is tilted in the arrow B direction, as compared with proper fitting (assembly posture) of the back door 24 with respect to the vehicle body 12.

Figure 9:
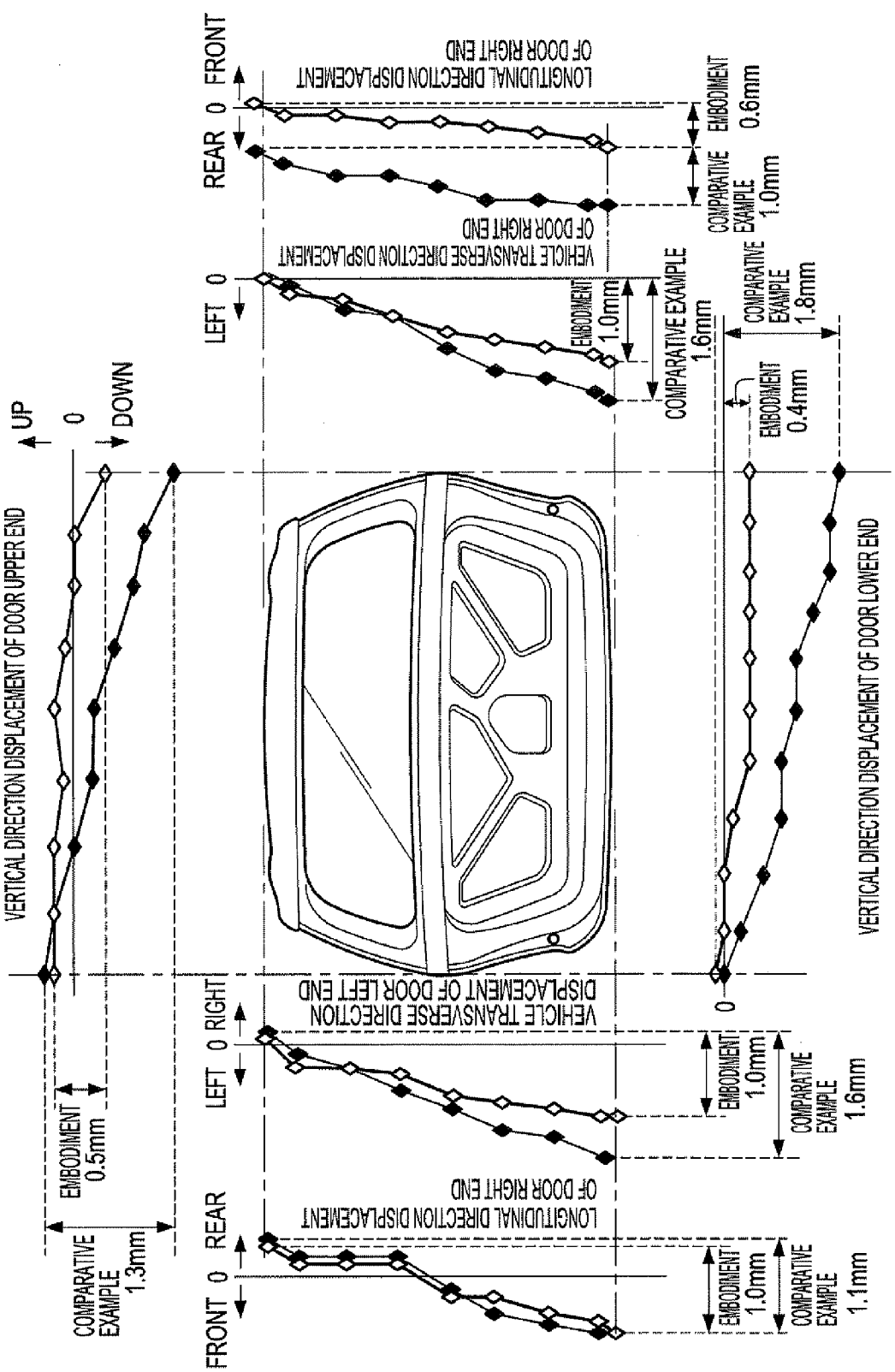
FIG. 9 is a graph showing, in comparison with a comparative example, improved effects of fitting a back door due to the back door structure relating to the first embodiment of the present invention is applied.

Concretely, as shown in FIG. 9, in a comparative example that is shown by the black plots, it can be understood that the upper end, the lower end of the back door 24 are displaced more greatly downward toward the right side (the side at which the damper 40 is set), due to the rotational displacement in the arrow A direction. Namely, it can be understood that, in the comparative example, at both the upper end, the lower end of the back door 24, the positional differences in the vertical direction between the respective right ends and the left ends thereof are large, and, at the right end sides, the differences with respect to the reference position (displacement 0) are large. Further, the vertical positional difference between the left and the right being greater at the lower end than at the upper end of the back door 24 is a cause of downward deformation of the back door 24 itself.

Further, it can be understood that, in this comparative example, the right end of the back door 24 is greatly displaced rearward from the reference position (displacement 0) due to the inclined displacement in the arrow B direction. Further, it can be understood that, due to the inclined displacement in the arrow B direction, the right end, the left end of the back door 24 both are displaced greatly toward the left side in the vehicle transverse direction.

In contrast, in the back door structure 10 having the rotation correcting structure 46, as shown in FIG. 9, the displacement in the vertical direction of the upper end, the lower end of the back door 24 due to the rotational displacement in the arrow A direction is suppressed as compared with the above-described comparative example. Namely, in the rotation correcting structure 46, in a state before supporting the back door 24, the mounting surface 20R at the right side (the side at which the damper 40 is set) is positioned at the upper side with respect to the mounting surface 20L at the left side. Therefore, the right side of the back door 24 is displaced more greatly downward than the left side, by an amount corresponding to at least a portion (ΔH) of the positional difference in the vertical direction between the mounting surface 20L and the mounting surface 20R accompanying the rotation in the arrow A direction. Accordingly, the left/right displacement difference at the upper end, the lower end of the back door 24 is shortened, as compared with the above-described comparative example, by an amount corresponding to at least a portion of the left/right displacement difference ΔH.

Figure 10A:
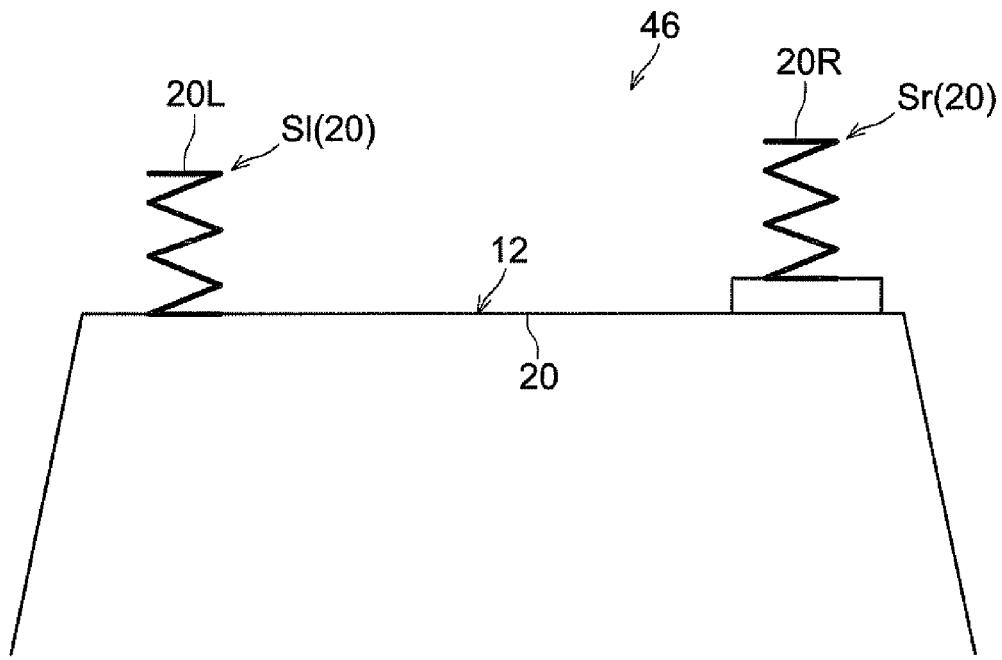
FIG. 10A is a schematic view in which a structure, before back door supporting of the rotation correcting structure that structures the back door structure relating to the first embodiment of the present invention, is modeled.
Figure 10B:
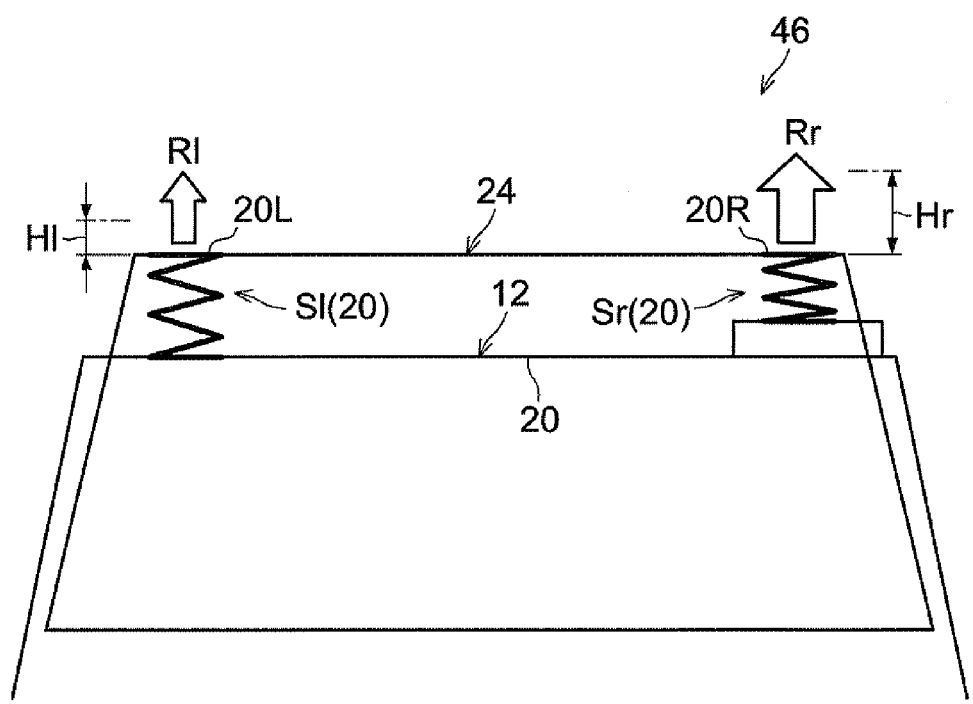
FIG. 10B is a schematic view in which a structure, in a state of back door supporting of the rotation correcting structure that structures the back door structure relating to the first embodiment of the present invention, is modeled.

Moreover, because the back door 24 greatly deforms the mounting surface 20R side of the rear roof header 20 by an amount corresponding to the aforementioned ΔH with respect to the mounting surface 20L side, the supporting reaction force from the vehicle body is greater at the right side than at the left side. Concretely, as schematically shown in FIG. 10A, it can be modeled as a structure in which the mounting surface 20L (the door hinge 26), the mounting surface 20R (the door hinge 28) of the rear roof header 20 are respectively supported by springs S1, Sr having a spring constant K and a natural length L, and the mounting surface 20R is offset upward with respect to the mounting surface 20L. As shown in FIG. 10B, given that the deformation amount of the spring S1 at the left side in a state of supporting the back door 24 is HI and the deformation amount of the spring Sr at the right side is Hr(=H1+ΔH), supporting reaction force R1 at the spring S1 side is R1=K×H1, and supporting reaction force Rr at the spring Sr side is Rr=K×Hr.

Due thereto, at the back door structure 10, the supporting reaction force Rr from the hinge 28 at the right side is made to be larger by an amount corresponding to ΔR=K×ΔH than the supporting reaction force R1 from the door hinge 26 at the left side, and rotation itself of the back door 24 in the arrow A direction is suppressed. Namely, on the basis of this reaction force difference, as shown in FIG. 8, a moment Ma in the direction opposite arrow A arises, and rotation of the back door 24 in the arrow A direction is suppressed by this moment Ma.

For these reasons, at the back door structure 10, as described above, displacement in the vertical direction of the upper end, the lower end of the back door 24 due to rotational displacement in the arrow A direction is suppressed.

Further, in the back door structure 10, the door supporting structure 45 has a reinforcing structure of the opening flange of the back window 24A peripheral edge at the back door 24. Therefore, the right side portion deforming downward due to the downwardly-directed load Fd from the damper 40 is suppressed at the back door 24. Due thereto, as can be understood from a comparison of the deformation amounts in the vertical direction of the upper end side and the lower end side shown in FIG. 9, a significant difference is not recognized in the left/right deformation amount differences at the upper end and the lower end of the back door 24.

Moreover, in the back door structure 10 that has the tilt correcting structure 48, as compared with the above-described comparative example shown in FIG. 9, displacement in the longitudinal direction of the left end, the right end of the back door 24 due to tilting displacement in the arrow 13 direction is suppressed. Namely, at the tilt correcting structure 48, the stopper 50 is provided at the side opposite the side at which the damper 40, that pushes the back door 24 rearward by the load Fb, is set, and, because this stopper 50 is interposed in a compressively deformed state between the back door 24 in the fully closed posture and the vehicle body 12, a moment Mb (see FIG. 8) in the opposite direction as the arrow B direction arises on the basis of the rearwardly-directed restoring force of the stopper 50. Tilting of the back door 24 in the arrow B direction is suppressed by this moment Mb.

Due thereto, as shown in FIG. 9, in the back door structure 10, displacement of the right end of the back door 24 toward the rear is markedly suppressed and the top/bottom displacement difference also is reduced as compared with the above-described comparative example. Further, the displacement of the back door 24 in the vehicle transverse direction also is suppressed as compared with the above-described comparative example.

Due to the above, in the back door structure 10 relating to the first embodiment, in a structure having the single damper 40, the back door 24 can be assembled (set in a well fitted state) to the vehicle body 12 properly (within the allowable range). At the vehicle V to which the back door structure 10 is applied, the back door 24 can be assembled to the vehicle body 12 by fitting that is the same as a vehicle that has a left and right pair of the dampers 40. In this way, in the vehicle V to which the back door structure 10 is applied, as compared with a vehicle that has a left and right pair of the dampers 40, the same fitting can be obtained by providing the stopper 50 instead of one of the dampers 40, and therefore, a decrease in costs can be realized while the quality of fitting of the back door 24 is ensured.

Moreover, in the back door structure 10, the mounting surface 20R is made to be a structure that is offset upward with respect to the mounting surface 20L, and there is a structure in which a positional difference between these in the vertical direction is set. Therefore, the left and right door hinges 26, 28 can be made to be common parts, and further, the left and right shims 39 can be used in common, which contributes to a further decrease in costs.

Further, in the back door structure 10, the stopper 50, that is formed of a soft material and is provided by lapping design, always contacts the back door 24 that is in the fully closed posture, and therefore, rattling of the lower end portion of the back door 24 with respect to the vehicle body 12 is suppressed. Accordingly, vibration, noise that are caused by rattling of the back door 24 are suppressed. Namely, while the quality of fitting of the back door 24 with respect to the vehicle body 12 is ensured, suppression of vibration, noise can be realized, which contributes to an improvement in the strength as a commodity of the vehicle V.

Moreover, by adjusting the screwed-together position of the male screw portion 50A with the screw hole 52, the projecting amount of the stopper 50 from the vehicle body can be adjusted in accordance with, for example, dispersion in the dimensional accuracies of the vehicle body 12 and the back door 24, or the like. Further, the stopper 50 can also be used in common in different types of vehicles.

Note that the first embodiment illustrates an example in which, by setting the mounting surface 20R at the protruding portion 20A of the rear roof header 20, the mounting surface 20R is offset upward with respect to the mounting surface 20L, but the present invention is not limited to this, and, for example, may be a structure in which the mounting surface 20R is offset upward with respect to the mounting surface 20L by, for example, setting the mounting surface 20L in a recess formed in the rear roof header 20.

(Other Embodiments)

Other embodiments of the present invention are described next. Note that parts and portions that are basically the same as structures of the above first embodiment or that were previously described are denoted by the same reference numerals as the structures of the above first embodiment or that were previously described, and description thereof is omitted.

(Second Embodiment)

Figure 11:
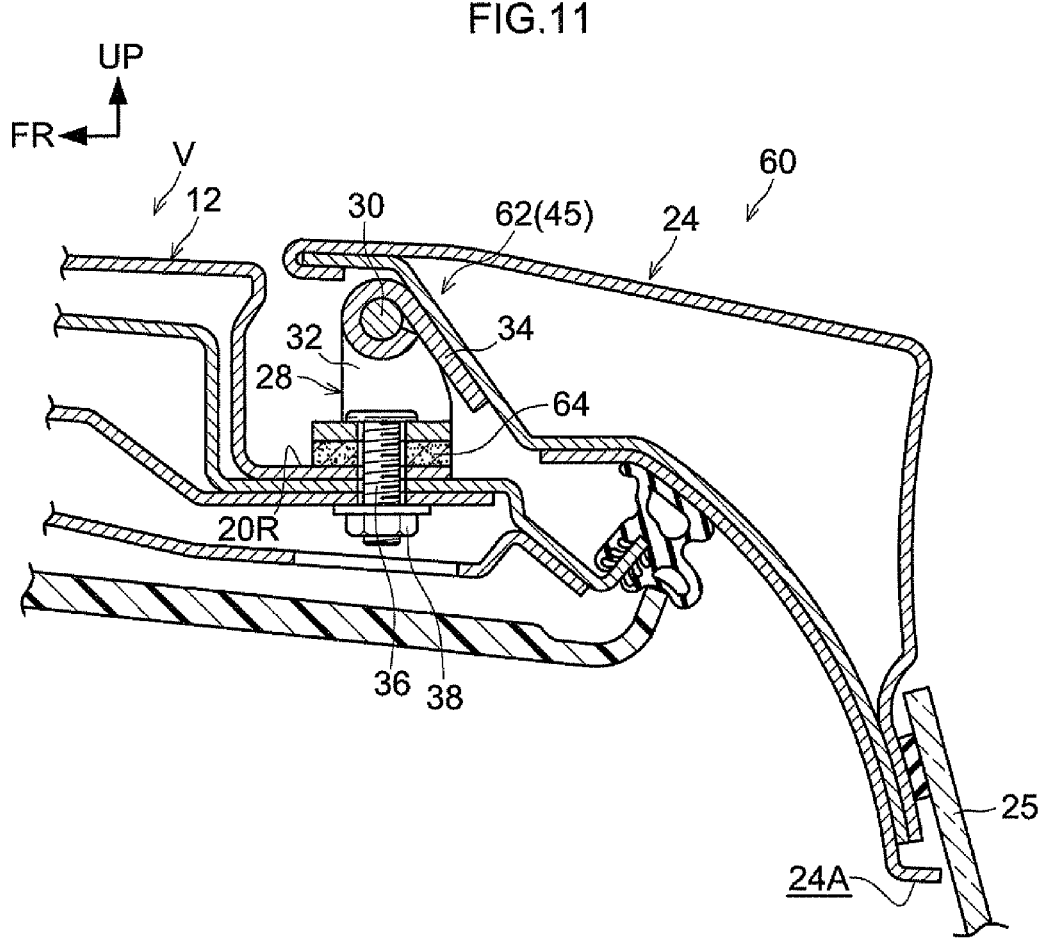
FIG. 11 is a sectional view along line 11-11 of FIG. 12, showing a rotation correcting structure that structures a back door structure relating to a second embodiment of the present invention.

A back door structure 60, to which a top-hinged door structure relating to a second embodiment of the present invention is applied, is shown in FIG. 11 in a side sectional view corresponding to FIG. 3. As shown in this drawing, the back door structure 60 is structured such that the door supporting structure 45 thereof has a rotation correcting structure 62 instead of the rotation correcting structure 46. The rotation correcting structure 62 is structured such that the mounting surface 20R is made to be the general surface of the rear roof header 20 in the same way as the mounting surface 20L, and so as to have a shim 64 instead of the shim 39.

Figure 12:
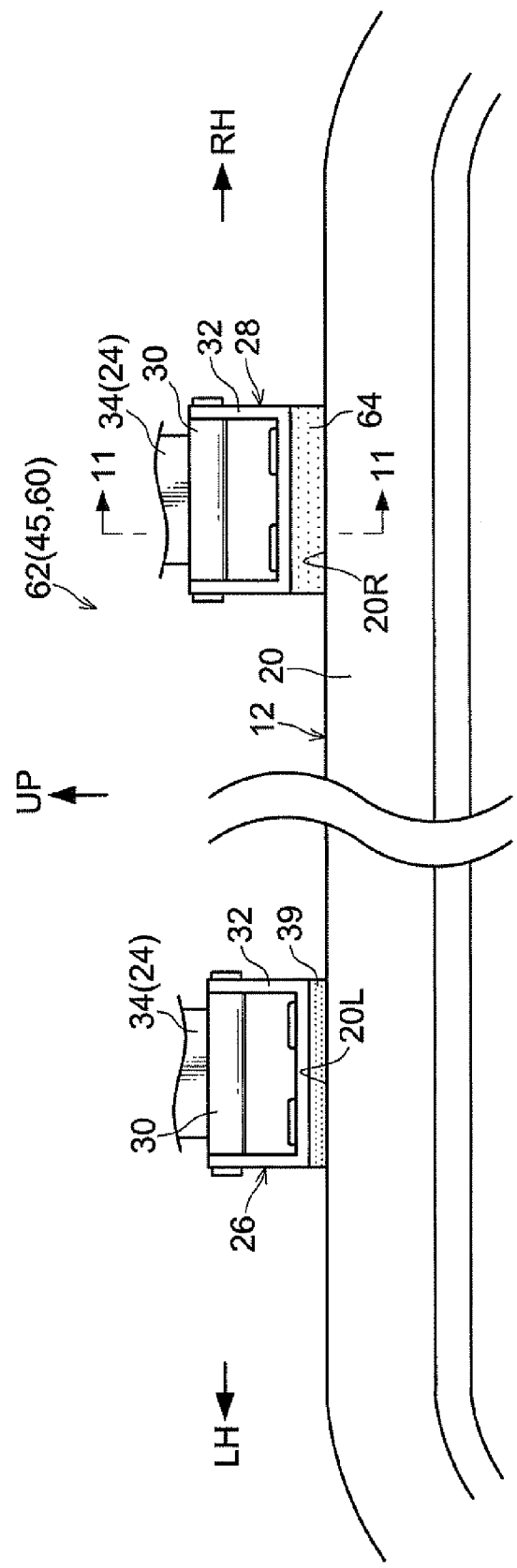
FIG. 12 is a rear view schematically showing the rotation correcting structure that structures the back door structure relating to the second embodiment of the present invention.

The shim 64 is thicker-walled than the shim 39, and, due to the wall thickness with the shim 39, a positional difference in the vertical direction between (the respective hinge shafts 30 of) the door hinge 26 and the door hinge 28 in a state of not supporting the back door 24 is created as shown in FIG. 12. Further, the shim 64 has rigidity (a spring constant) that is the same as or greater than that of the shim 39, and, accompanying the assembly of the back door 24, is compressively deformed more greatly than the shim 39. The other structures at the back door structure 60, including the portions that are not illustrated, are basically the same as the corresponding structures of the back door structure 10 relating to the first embodiment.

Accordingly, due to the back door structure 60 relating to the second embodiment as well, operation and effects that are basically similar to the back door structure 10 are exhibited. Note that, in the back door structure 60, structures, in which the rigidity of the shim 64 is set to be low or the like and the operation and effects due to the deformation amount difference $\Delta H$ in the vertical direction between the shim 64 and the shim 39 generating the moment Ma are not exhibited or such effects are small, also are included in the present invention.

(Third Embodiment)

Figure 13:
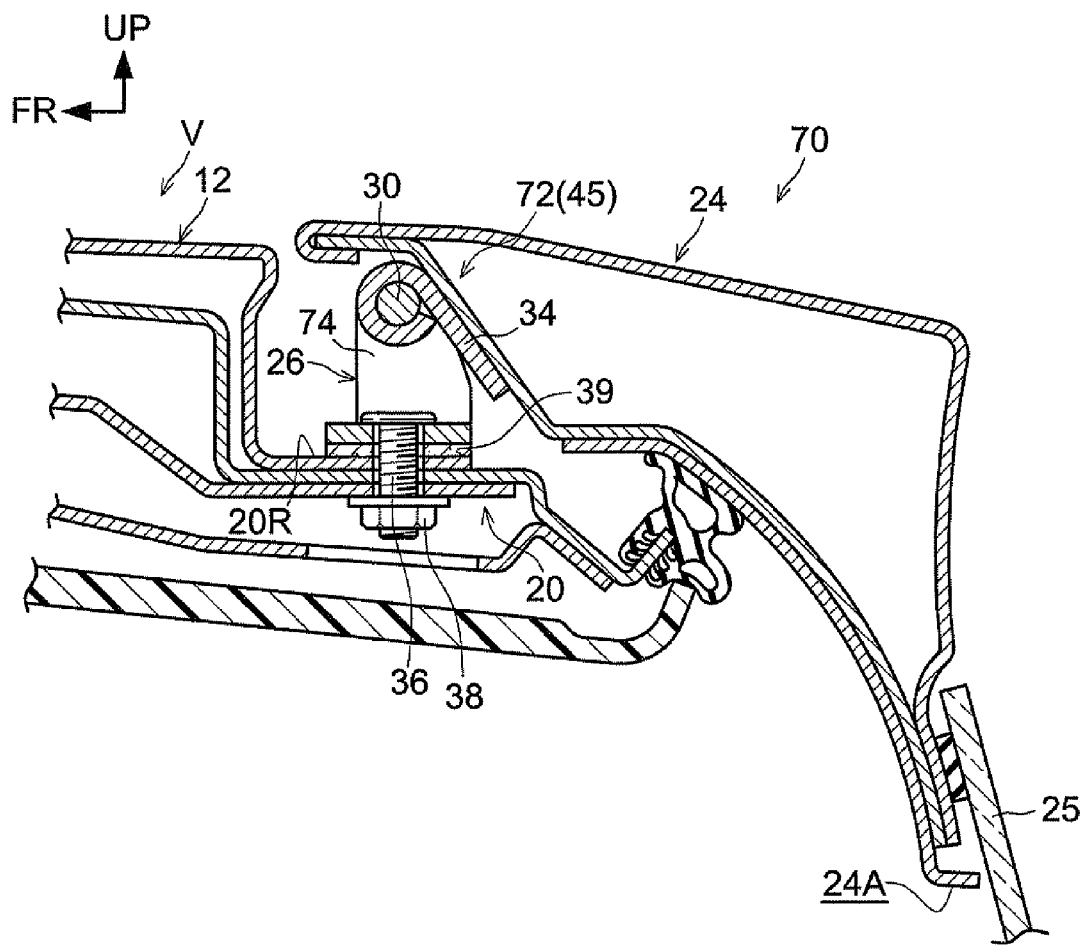
FIG. 13 is a sectional view along line 13-13 of FIG. 14, showing a rotation correcting structure that structures a back door structure relating to a third embodiment of the present invention.

A back door structure 70, to which a top-hinged door structure relating to a third embodiment of the present invention is applied, is shown in FIG. 13 in a side sectional view corresponding to FIG. 3. As shown in this drawing, the back door structure 70 is structured such that the door supporting structure 45 thereof has a rotation correcting structure 72 instead of the rotation correcting structure 46. The rotation correcting structure 72 is structured such that the mounting surface 20R is made to be the general surface of the rear roof header 20 in the same way as the mounting surface 20L, and such that the door hinge 28 has, instead of the hinge bracket 32, a hinge bracket 74 that is vertically taller than that.

Figure 14:
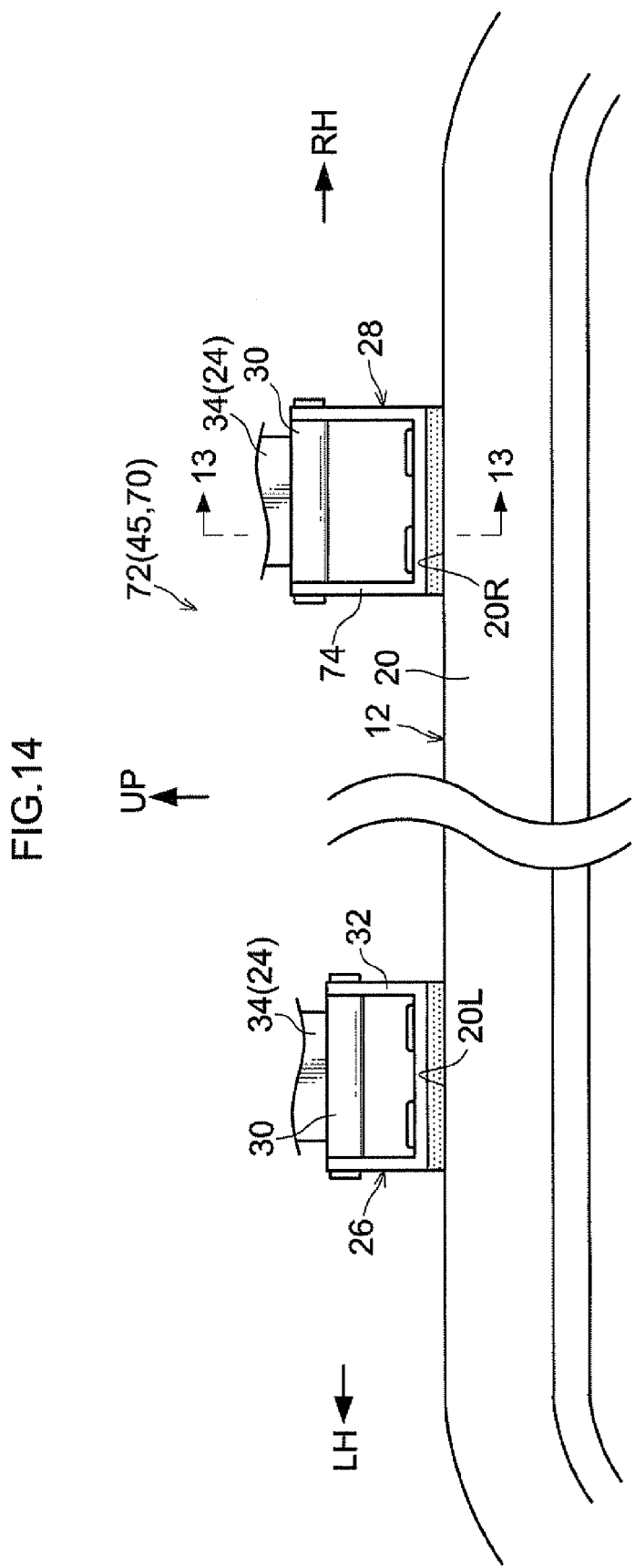
FIG. 14 is a rear view schematically showing the rotation correcting structure that structures the back door structure relating to the third embodiment of the present invention.

Namely, as shown in FIG. 14 as well, the hinge bracket 74 that structures the door hinge 28 is a structure in which the height from the general surface of the rear roof header 20, i.e., the mounting surfaces 20L, 20R, to the hinge shaft 30 is high as compared with the hinge bracket 32 of the door hinge 26. Due thereto, in the back door structure 70, the hinge bracket 74 creates a positional difference in the vertical direction between (the respective hinge shafts 30 of) the door hinge 26 and the door hinge 28 in a state of not supporting the back door 24. The other structures at the back door structure 70, including the portions that are not illustrated, are basically the same as the corresponding structures of the back door structure 10 relating to the first embodiment.

Accordingly, due to the back door structure 70 relating to the third embodiment as well, operation and effects that are basically similar to the back door structure 10 are exhibited.

(Fourth Embodiment)

Figure 15:
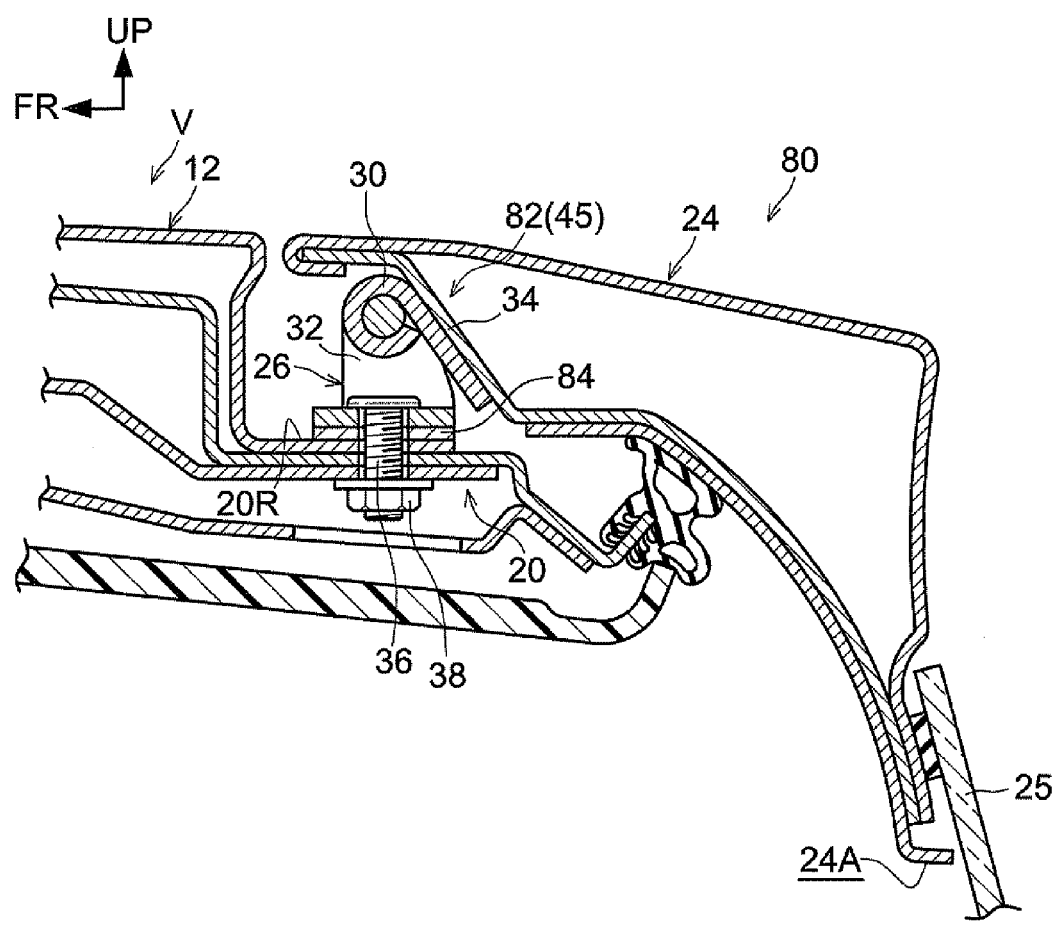
FIG. 15 is a sectional view along line 15-15 of FIG. 16, showing a rotation correcting structure that structures a back door structure relating to a fourth embodiment of the present invention.
Figure 16:
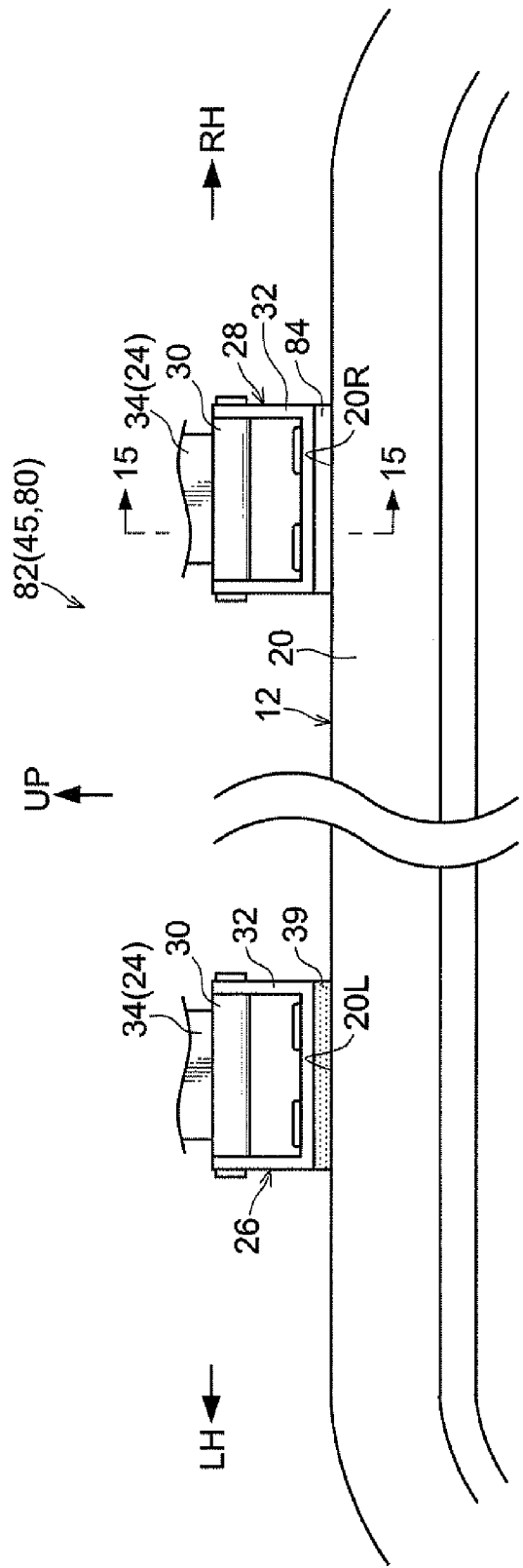
FIG. 16 is a rear view schematically showing the rotation correcting structure that structures the back door structure relating to the fourth embodiment of the present invention.

A back door structure 80, to which a top-hinged door structure relating to a fourth embodiment of the present invention is applied, is shown in FIG. 15 in a side sectional view corresponding to FIG. 3. As shown in this drawing, the back door structure 80 is structured such that the door supporting structure 45 thereof has a rotation correcting structure 82 instead of the rotation correcting structure 46. The rotation correcting structure 82 is structured such that the mounting surface 20R is made to be the general surface of the rear roof header 20 in the same way as the mounting surface 20L, and so as to have a shim 84 instead of the shim 39.

The shim 84 is formed of, for example, a metal material or the like, and has higher rigidity than the shim 39 that is formed of a synthetic resin or the like. In this embodiment, the thickness of the shim 84 is equivalent to the thickness of the shim 39. The other structures at the back door structure 80, including the portions that are not illustrated, are basically the same as the corresponding structures of the back door structure 10 relating to the first embodiment.

Accordingly, due to the back door structure 80 relating to the fourth embodiment as well, operation and effects that are basically similar to the back door structure 10 are exhibited.

To supplement this point, at the back door structure 80, the difference in rigidities (ease of deformation) of the left and right shims 39, 82 corresponds to the positional difference in the vertical direction between the mounting surface 20L and the mounting surface 20R at the back door structure 10. Namely, in the back door structure 80, accompanying the rotational displacement of the back door 24 in the arrow A direction, the rear roof header 20 is deformed more greatly at the right side (the side at which the damper is set 40) than at the left side, by an amount corresponding to the difference in the deformation amounts of the left and right shims 39, 82, and the supporting reaction force at the right side becomes large, and the aforementioned rotational displacement of the back door 24 is suppressed. On the other hand, because the shim 39 is compressively deformed more greatly than the shim 84, the left/right difference in vertical direction displacement of the back door 24 is suppressed.

(Fifth Embodiment)

Figure 17:
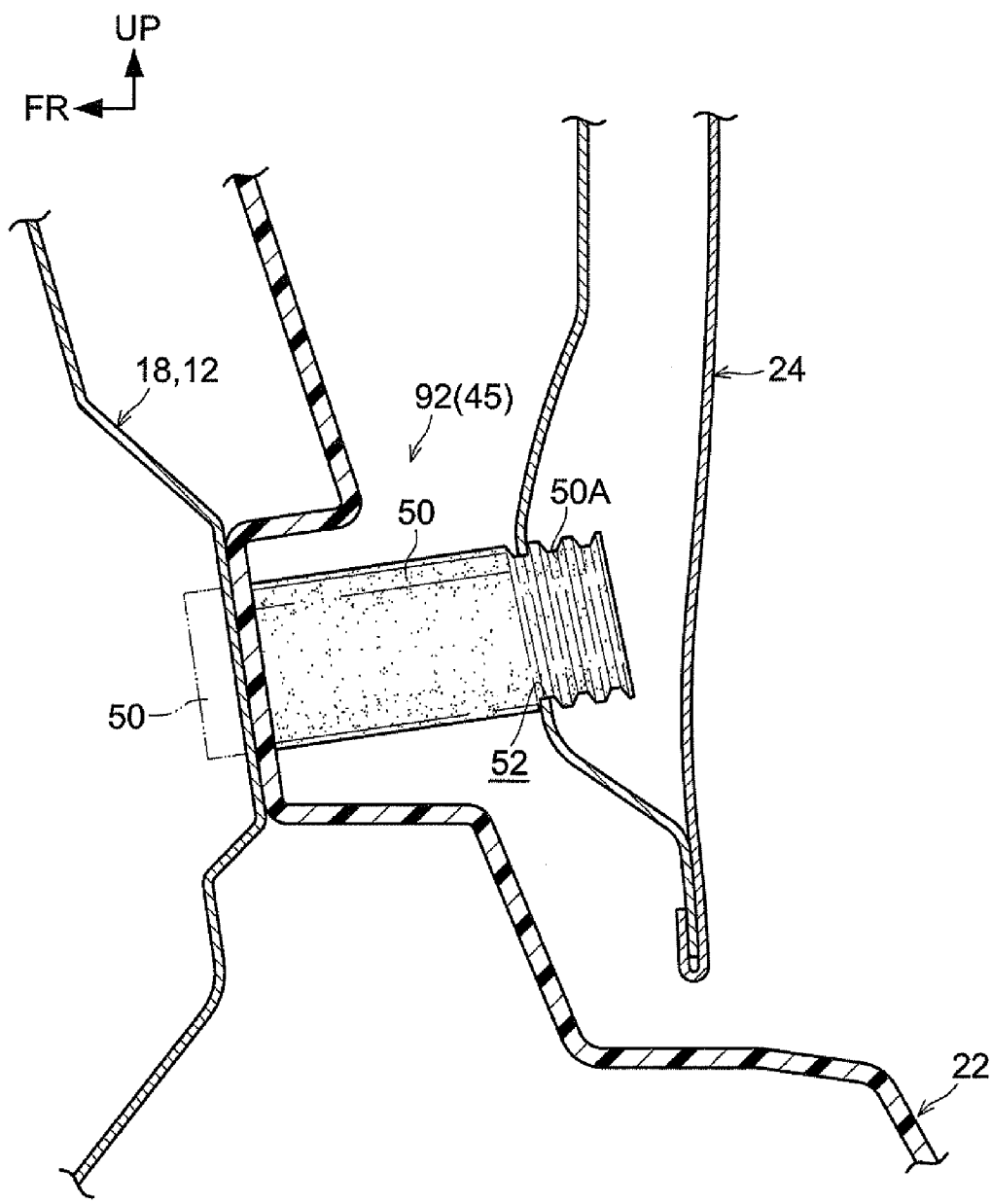
FIG. 17 is a side sectional view schematically showing a tilt correcting structure that structures a back door structure relating to a fifth embodiment of the present invention.

A back door structure 90, to which a top-hinged door structure relating to a fifth embodiment of the present invention is applied, is shown in FIG. 17 in a side sectional view corresponding to FIG. 6. As shown in this drawing, the back door structure 90 is structured such that the door supporting structure 45 thereof has a tilt correcting structure 92 instead of the tilt correcting structure 48. The tilt correcting structure 92 is structured such that the stopper 50 is mounted to the back door 24 instead of the rear pillar 18 (the vehicle body 12).

Due to the stopper 50 that structures the tilt correcting structure 92 being screwed-together with the screw hole 52 that is formed in the back door 24, the stopper 50 is mounted so the back door 24 side such that the amount of projection toward the vehicle body 12 side can be adjusted. Although not illustrated, the set position of the stopper 50 at the tilt correcting structure 92 as seen in rear view is the same as the set position of the stopper 50 at the back door structure 10 (60, 70, 80) as seen in rear view. The other structures at the back door structure 90, including the portions that are not illustrated, are basically the same as the corresponding structures of the back door structure 10 relating to the first embodiment.

Accordingly, due to the back door structure 90 relating to the fifth embodiment as well, operation and effects that are basically similar to the back door structure 10 are exhibited.

Note that the above-described respective embodiments illustrate examples in which the door supporting structure 45 has both the rotation correcting structure 46, 62, 72, 82 and the tilt correcting structure 48, 92, but the present invention is not limited to this, and may be structured so as to have, for example, either one of the rotation correcting structure 46, 62, 72, 82 and the tilt correcting structure 48, 92.

Further, the above-described respective embodiments illustrate examples in which the peripheral edge portion of the back window 24A at the back door 24 is reinforced, but the present invention is not limited to this, and may be structured such that, for example, the peripheral edge portion of the back window 24A at the back door 24 is not reinforced. Further, instead of a reinforcing structure by an adhesive, there may be a structure in which the peripheral edge portion of the back window 24A at the back door 24 is reinforced by increasing the plate thickness of the opening flange of the peripheral edge of the back window 24A, or joining a reinforcing ember.

Moreover, the above-described embodiments illustrate examples in which the damper 40 is disposed at the right side of the vehicle body 12, the back door 24, but the present invention is not limited to this, and may be structured such that, for example, the damper 40 is disposed at the left side of the vehicle body 12, the back door 24.

Further, the above-described embodiments illustrate examples in which the damper 40 that is a gas damper is used as the door holding mechanism, but the present invention is not limited to this, and for example, a damper in which a liquid (oil) is sealed instead of gas or in addition to gas may be used as the door holding mechanism, or, for example, a combination of a damper and a link mechanism or the like may be used as the door holding mechanism.

Still further, the above-described embodiments illustrate examples in which the male screw portion 50A is formed at the stopper 50, and the amount of projection of the stopper 50 toward the back door 24 side (or the vehicle body 12 side) can be adjusted, but the present invention is not limited to this, and, for example, may be structured such that the stopper 50 is fixed to the vehicle body 12 or the back door 24.

Moreover, the above-described embodiments illustrate examples in which the top-hinged door structure relating to the present invention is applied to the back door structure 10, 60, 70, 80, 90, but, for example, the present invention may be applied to a gull-wing-type side door that rotates around a hinge shaft running along the longitudinal direction and opens and closes an opening portion that is a passenger entrance/exit.

Still further, the above-described embodiments illustrate examples in which the door hinge 26, the door hinge 28 are fixed to the rear roof header 20 by bolts 36 that vertically pass-through the mounting surfaces 20L, 20R that are surfaces that face toward the upper side, but the present invention is not limited to this, and may be structured, for example, such that the door hinge 26, the door hinge 28 are fixed to the rear roof header 20 by bolts 36 that longitudinally pass-through the mounting surfaces 20L, 20R that are surfaces that face rearward.

The invention claimed is:

1. A top-hinged door structure for a vehicle having a vehicle body, the top-hinged door structure comprising:
   a pair of hinges that are configured to be disposed on the vehicle body and are spaced apart in a horizontal direction, at an upper side in a vehicle vertical direction with respect to an opening portion formed in the vehicle body, each hinge including a hinge shaft;
   a door that is configured to be supported on the vehicle body by the pair of hinges, and to open and close the opening portion by rotating upon the hinge shafts of the hinges;
   a door holding mechanism that is configured to be disposed between the door and the vehicle body at one end side of the door in the horizontal direction, the door holding mechanism providing a resistance force against self-weight of the door and maintaining a position where the door fully opens the opening portion, and that, due to load exceeding the resistance force, permits the door being moved in a direction of closing the opening portion; and
   a door supporting structure that includes a mounting surface monolithically formed on the vehicle body, the mounting surface being structured such that, in a state of not supporting the door, one hinge shaft of the one hinge that is positioned at a side at which the door holding mechanism is set among the pair of hinges, is offset further toward an upper side in the vehicle vertical direction than the other hinge shaft of the other hinge.

2. A top-hinged door structure for a vehicle having a vehicle body, the top-hinged door structure comprising:
   a first hinge and a second hinge each configured to be disposed on the vehicle body and are spaced apart in a horizontal direction, at an upper side in a vehicle vertical direction with respect to an opening portion formed in the vehicle body, each hinge including a hinge shaft;

a door that is configured to be supported on the vehicle body by the first and second hinges, and to open and close the opening portion by rotating upon hinge shafts of the first and second hinges;

a door holding mechanism that is configured to be disposed between the door and the vehicle body at one end side of the door in the horizontal direction, the door holding mechanism providing a resistance force against self-weight of the door and maintaining a position where the door fully opens the opening portion, and that, due to load exceeding the resistance force, permits the door being moved in a direction of closing the opening portion; and a door supporting structure that includes a mounting surface monolithically formed on the vehicle body, the mounting surface being structured such that a first supporting reaction force of a first mounting portion of the first hinge is greater than a second supporting reaction force of a second mounting portion of the second hinge, the supporting reaction force being applied in the vertical direction.

3. The top-hinged door structure of claim 2, wherein the door supporting structure is structured such that, in the state of not supporting the door, the mounting surface to which the hinge at the vehicle body is mounted is offset further toward the upper side in the vehicle vertical direction at one hinge side that is positioned at the side at which the door holding structure is set, than at the other hinge side.

4. The top-hinged door structure of claim 1, wherein
the respective mounting surfaces are surfaces that face toward an upper side in the vehicle vertical direction, and
the first and second hinges are fixed to the vehicle body by bolts that pass-through, in the vehicle vertical direction, a vehicle body panel that has the mounting surfaces.

5. The top-hinged door structure of claim 1, further comprising a regulating member that is provided between the vehicle body and a portion, at an opposite side in the horizontal direction of the side at which the door holding structure is set, at a lower portion of the door in the vehicle vertical direction, and that regulates the door, that is in a posture of closing the opening portion, being displaced in a direction of closing the opening portion with respect to the vehicle body.

6. A top-hinged door structure for a vehicle having a vehicle body, the top-hinged door structure comprising:
a pair of hinges configured to be disposed on the vehicle body and are spaced apart in a horizontal direction, at an upper side in a vehicle vertical direction with respect to an opening portion formed in the vehicle body, each hinge including a hinge shaft;
a door that is configured to be supported on the vehicle body by the pair of hinges, and to open and close the opening portion by rotating upon hinge shafts of the first and second hinges;
a door holding mechanism that is configured to be disposed between the door and the vehicle body at one end side of the door in the horizontal direction, and the door holding mechanism providing a resistance force against self-weight of the door and maintaining a position where the door fully opens the opening portion, and that, due to load exceeding the resistance force, permits the door being moved in a direction of closing the opening portion;
a door holding structure that includes a mounting surface monolithically formed on the vehicle body;

a regulating member that is configured to be provided only between the vehicle body and a portion of the door in the vehicle vertical direction, the regulating member being disposed at an opposite side in the horizontal direction of a side at which the door holding structure is set, the regulating member being configured to regulate the door such that the door is displaced in a direction of closing the opening portion with respect to the vehicle body where the door is in a position of closing the opening portion.

7. The top-hinged door structure of claim 5, wherein, in a state in which the door closes the opening portion, the regulating member is disposed so as to be elastically compressed between the door and the vehicle body.

8. The top-hinged door structure of claim 1, wherein the door is structured to have a window portion, and at least a portion of a peripheral edge portion of the window portion is reinforced with respect to load in the vehicle vertical direction.

9. The top-hinged door structure of claim 1, wherein the door holding mechanism is structured by a vehicle body side member, that is connected to a portion positioned at one end side in the horizontal direction with respect to the opening portion at an upper portion of the vehicle body, and a door side member, that is connected to a same side as a connected side of the vehicle body side member with respect to the opening portion at the door, the vehicle body side member and the door side member being connected so as to be able to extend and contract due to relative displacement in a mutual longitudinal direction, and
the door holding mechanism is structured so as to generate assisting force while extending when the door opens the opening portion, and so as to generate the resistance force while shortening when the door closes the opening portion.

10. The top-hinged door structure of claim 3, wherein
the respective mounting surfaces are surfaces that face toward an upper side in the vehicle vertical direction, and
the pair of hinges are fixed to the vehicle body by bolts that pass-through, in the vehicle vertical direction, a vehicle body panel that has the mounting surfaces.

11. The top-hinged door structure of claim 2, further comprising a regulating member that is provided between the vehicle body and a portion, at an opposite side in the horizontal direction of the side at which the door holding structure is set, at a lower portion of the door in the vehicle vertical direction, and that regulates the door, that is in a posture of closing the opening portion, being displaced in a direction of closing the opening portion with respect to the vehicle body.

12. The top-hinged door structure of claim 6, wherein, in a state in which the door closes the opening portion, the regulating member is disposed so as to be elastically compressed between the door and the vehicle body.

13. The top-hinged door structure of claim 11, wherein, in a state in which the door closes the opening portion, the regulating member is disposed so as to be elastically compressed between the door and the vehicle body.

14. The top-hinged door structure of claim 2, wherein the door is structured to have a window portion, and at least a portion of a peripheral edge portion of the window portion is reinforced with respect to load in the vehicle vertical direction.

15. The top-hinged door structure of claim 6, wherein the door is structured to have a window portion, and at least a portion of a peripheral edge portion of the window portion is reinforced with respect to load in the vehicle vertical direction.

16. The top-hinged door structure of claim 2, wherein the door holding mechanism is structured by a vehicle body side member, that is connected to a portion positioned at one end side in the horizontal direction with respect to the opening portion at an upper portion of the vehicle body, and a door side member, that is connected to a same side as a connected side of the vehicle body side member with respect to the opening portion at the door, the vehicle body side member and the door side member being connected so as to be able to extend and contract due to relative displacement in a mutual longitudinal direction, and the door holding mechanism is structured so as to generate assisting force while extending when the door opens the opening portion, and so as to generate the resistance force while shortening when the door closes the opening portion.

17. The top-hinged door structure of claim 6, wherein the door holding mechanism is structured by a vehicle body side member, that is connected to a portion positioned at one end side in the horizontal direction with respect to the opening portion at an upper portion of the vehicle body, and a door side member, that is connected to a same side as a connected side of the vehicle body side member with respect to the opening portion at the door, the vehicle body side member and the door side member being connected so as to be able to extend and contract due to relative displacement in a mutual longitudinal direction, and the door holding mechanism is structured so as to generate assisting force while extending when the door opens the opening portion, and so as to generate the resistance force while shortening when the door closes the opening portion.

* * * * *